(12) United States Patent
Rand

(10) Patent No.: US 12,361,395 B2
(45) Date of Patent: Jul. 15, 2025

(54) METHOD AND SYSTEM FOR SYNCHRONISING USER EVENT STREAMS WITH DUST-BASED RENDEZVOUS TRANSACTIONS

(71) Applicant: nChain Licensing AG, Zug (CH)

(72) Inventor: Ricky Charles Rand, London (GB)

(73) Assignee: nChain Licensing AG, Zug (CH)

( * ) Notice: Subject to any disclaimer, the term of this patent is extended or adjusted under 35 U.S.C. 154(b) by 14 days.

(21) Appl. No.: 18/275,600

(22) PCT Filed: Jun. 23, 2022

(86) PCT No.: PCT/EP2022/067260
§ 371 (c)(1),
(2) Date: Aug. 2, 2023

(87) PCT Pub. No.: WO2022/268995
PCT Pub. Date: Dec. 29, 2022

(65) Prior Publication Data
US 2024/0112161 A1 Apr. 4, 2024

(30) Foreign Application Priority Data
Jun. 24, 2021 (GB) .................... 2109064

(51) Int. Cl.
*G06Q 20/10* (2012.01)
*G06Q 20/06* (2012.01)
(Continued)

(52) U.S. Cl.
CPC .......... *G06Q 20/10* (2013.01); *G06Q 20/381* (2013.01); *G06Q 20/3825* (2013.01);
(Continued)

(58) Field of Classification Search
CPC .. G06Q 20/10; G06Q 20/381; G06Q 20/3825; G06Q 20/389; G06Q 20/401;
(Continued)

(56) References Cited

U.S. PATENT DOCUMENTS

| 11,398,911 B1 * | 7/2022 | Gunning ............. G07F 17/0014 |
| 2005/0177518 A1 | 8/2005 | Brown |

(Continued)

FOREIGN PATENT DOCUMENTS

| EP | 1986303 A1 | 10/2008 |
| EP | 3387785 B1 | 2/2019 |

(Continued)

OTHER PUBLICATIONS

Zamyatin et al. "TxChain: Efficient Cryptocurrency Light Clients via Contingent Transaction Aggregation", IACR, International Association For Cryptographic Research, vol. 20200518:203342, May 18, 2022, 21 pages (Year: 2022).*

(Continued)

*Primary Examiner* — James D Nigh
(74) *Attorney, Agent, or Firm* — Messner Reeves LLP

(57) ABSTRACT

A method is provided by which payments for assets are recorded using blockchain transactions, and verified based on immutable logs associated with the transactions.

14 Claims, 19 Drawing Sheets

(51) Int. Cl.
  *G06Q 20/38* (2012.01)
  *G06Q 20/40* (2012.01)
  *H04L 9/00* (2022.01)
  *H04L 9/32* (2006.01)

(52) U.S. Cl.
  CPC ......... *G06Q 20/389* (2013.01); *G06Q 20/401* (2013.01); *H04L 9/50* (2022.05)

(58) Field of Classification Search
  CPC ............. G06Q 20/065; G06Q 20/0655; G06Q 20/108; H04L 9/50; H04L 9/3247; H04L 2209/56
  USPC .......................................................... 705/75
  See application file for complete search history.

(56) References Cited

U.S. PATENT DOCUMENTS

| | | |
|---|---|---|
| 2013/0198020 A1 | 8/2013 | Siim et al. |
| 2014/0172472 A1 | 6/2014 | Florimond et al. |
| 2019/0130398 A1 | 5/2019 | Brown |
| 2022/0138748 A1* | 5/2022 | Millar .................... G06Q 40/04 705/75 |

FOREIGN PATENT DOCUMENTS

| | | |
|---|---|---|
| WO | 2021008117 A1 | 1/2021 |
| WO | 2021048662 A1 | 3/2021 |

OTHER PUBLICATIONS

Alexei Zamyatin et al: "TxChain: Efficient Cryptocurrency Light Clients via Contingent Transaction Aggregation", IACR, International Association for Cryptologic Research, vol. 20200518:203342 , May 18, 2020 (May 18, 2020), pp. 1-21, XP061035866, Retrieved from the Internet: URL:http://eprint.iacr.org/2020/580.pdf [retrieved on May 18, 2020] section 6.1.
GB2109064.2 Combined Search Report and Abbreviated Examination Report dated Dec. 10, 2021, 7 pages.
PCT International Search Report and Written Opinion dated Dec. 22, 2022, 21 pages.

* cited by examiner

| E-Alice | E-Bob | E-HSBC | E-Revolut |
|---|---|---|---|
| 1 ES1 | 1 ES1 | 1 ES1 | 1 ES1 |
| 2 ES2 | 2 ES2 | 2 ES2 | 2 ES2 |
| 3 ES3 | 3 ES3 | 3 ES3 | 3 ES3 |
| 4 ES4 | 4 ES4 | 4 ES4 | 4 ES4 |
| 5 # of payment instruction metadata | 5 ES5 | 5 # of payment instruction metadata | 5 ES3 |
|  | 6 ES6 |  | 6 ES4 |
|  | 7 # of payment instruction metadata |  | 7 # of payment instruction metadata |

Fig. 4c

| E-Alice | | E-Bob | | E-HSBC-GBP | | E-HSBC-EUR | |
|---|---|---|---|---|---|---|---|
| 1 | ES1 | 1 | ES1 | 1 | ES1 | 1 | ES1 |
| 2 | ES2 | 2 | ES2 | 2 | ES2 | 2 | ES2 |
| 3 | ES3 | 3 | ES3 | 3 | ES3 | 3 | ES3 |
| 4 | ES4 | 4 | ES4 | 4 | ES4 | 4 | ES4 |
| 5 | # of payment instruction metadata | 5 | ES5 | 5 | # of payment instruction metadata | 5 | ES3 |
| | | 6 | ES6 | | | 6 | ES4 |
| | | 7 | # of payment instruction metadata | | | 7 | # of payment instruction metadata |

Fig. 5c

METHOD AND SYSTEM FOR SYNCHRONISING USER EVENT STREAMS WITH DUST-BASED RENDEZVOUS TRANSACTIONS

CROSS REFERENCE TO RELATED APPLICATIONS

This application is the U.S. National Stage of International Application No. PCT/EP2022/067260 filed on Jun. 23, 2022, which claims the benefit of United Kingdom Patent Application No. 2109064.2, filed on Jun. 24, 2021, the contents of which are incorporated herein by reference in their entireties.

TECHNICAL FIELD

This disclosure relates generally to methods and systems for implementing a platform of one or more services associated with a distributed ledger, i.e. a blockchain, for one or more clients. Particularly, the present disclosure relates, but is not limited to, the provision of access to a plurality functions and applications associated with a blockchain for one or more clients, such as the enabling the transfer of digital or tokenised assets.

BACKGROUND

In this document we use the term 'blockchain' to include all forms of electronic, computer-based, distributed ledgers. These include consensus-based blockchain and transaction-chain technologies, permissioned and un-permissioned ledgers, shared ledgers, public and private blockchains, and variations thereof. The most widely known application of blockchain technology is the Bitcoin ledger, although other blockchain implementations have been proposed and developed. While Bitcoin may be referred to herein for the purpose of convenience and illustration, it should be noted that the disclosure is not limited to use with the Bitcoin blockchain, and alternative blockchain implementations and protocols associated with any kind of digital asset or a representation of a digital asset fall within the scope of the present disclosure. The terms "client", "entity", "node", "user", "sender", "recipient", "payer", "payee" may refer herein to a computing or processor-based resource. The term "Bitcoin" is used herein to include any version or variation that derives from or is based on the Bitcoin protocol. The term "digital asset" may refer to any transferrable asset, such as cryptocurrency, tokens representing at least a part of a property, a smart contract, a license, i.e. software licence, or DRM contracts for media content, etc. It will be understood that the term "digital asset" is used throughout this document to represent a commodity that may be associated with a value, which may be transferred to or provided as a payment in a transaction from one entity to another.

A blockchain is a peer-to-peer, electronic ledger, which is implemented as a computer-based, decentralised, distributed system made up of blocks, which in turn are made up of transactions. Each transaction is a data structure that encodes the transfer of control of a digital asset between participants in the blockchain system and includes at least one input and at least one output. Each block contains a hash of the previous block so that blocks become chained together to create a permanent, unalterable record of all transactions which have been written to the blockchain since its inception. Transactions contain small programs known as scripts, embedded into their inputs and outputs, which specify how and by whom the outputs of the transactions can be accessed. On the Bitcoin platform, these scripts are written using a stack-based scripting language.

In order for a transaction to be written to the blockchain it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid, and the transaction is then written to the blockchain. Thus, in order for a transaction to be written to the blockchain, it must be i) validated by the first node that receives the transaction—if the transaction is validated, the node relays it to the other nodes in the network; ii) added to a new block built by a miner; and iii) mined, i.e. added to the public ledger of past transactions.

It will be appreciated that the nature of the work performed by miners will depend on the type of consensus mechanism used to maintain the blockchain. While proof of work (PoW) is associated with the original Bitcoin protocol, it will be appreciated that other consensus mechanisms, such as, proof of stake (PoS), delegated proof of stake (DPoS), proof of capacity (PoC), proof of elapsed time (PoET), proof of authority (PoA) etc. may be used. Different consensus mechanisms vary in how mining is distributed between nodes, with the odds of successfully mining a block depending on e.g. a miner's hashing power (PoW), an amount of cryptocurrency held by a miner (PoS), an amount of cryptocurrency staked on a delegate miner (DPoS), a miner's ability to store pre-determined solutions to a cryptographic puzzle (PoC), a wait time randomly assigned to a miner (PoET), etc. Typically, miners are provided with an incentive or reward for mining a block. The Bitcoin blockchain, for example, rewards miners with newly issued cryptocurrency (Bitcoin) and fees associated with transactions in the block (transaction fees). For the Bitcoin blockchain, the amount of cryptocurrency issued diminishes with time, with the incentive eventually consisting of transaction fees only. It will be appreciated, therefore, that the handling of transaction fees is a part of the underlying mechanism for committing data to public blockchains such as the Bitcoin blockchain.

As mentioned previously, each transaction in a given block encodes the transfer of control of a digital asset between participants in the blockchain system. The digital asset need not necessarily correspond to a cryptocurrency. For example, the digital asset may pertain to a digital representation of a document, image, physical object, etc. The payment of cryptocurrency and/or transaction fees to miners may simply act as an incentive to maintain the validity of the blockchain by performing the necessary work. It may be that the cryptocurrency associated with the blockchain acts as a security for miners, with the blockchain itself being a ledger for transactions that predominantly relate to digital assets other than cryptocurrency. In some cases, it may be that the transfer of cryptocurrency between participants is handled by an entity that is different from and/or independent of the entity using the blockchain to maintain a ledger of transactions.

Once stored in the blockchain as a UTXO, a user can transfer control of the associated resource to another address associated with an input in another transaction. This transfer is usually, but not essentially, done using a digital wallet. This digital wallet may be a device; physical medium; program; application (app) on a computing device such as a desktop, laptop or a mobile terminal; or a remotely-hosted service, associated with a domain on a network, such as the Internet. The digital wallet stores public and private keys and can be used to track ownership of resources; tokens and assets etc., that are associated with a user; receive or spend digital assets; transfer tokens which may relate to digital assets, such as cryptocurrencies, licences, property, or other types of resource.

Although blockchain technology is most widely known for the use of cryptocurrency implementation, digital entrepreneurs are exploring the use of both the cryptographic security system Bitcoin is based on, and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper-proof records of events, distributed processing etc.) while being more versatile in their applications.

One area of current research is the use of the blockchain for the implementation of "smart contracts". These are computer programs designed to automate the execution of the terms of a machine-readable contract or agreement. Unlike a traditional contract which would be written in natural language, a smart contract is a machine-executable program, which comprises rules that can process inputs in order to produce results, which can then cause actions to be performed dependent upon those results.

Specifically, one area of research is into the transfer of assets and how it can be recorded on the blockchain to ensure the transfer benefits from the immutability of the blockchain. Further, it is of specific interest to provide an efficient and secure protocol for the transfer of assets in addition to a means of logging such a transfer to ensure that it is securely recorded and logged with the support of the underlying blockchain infrastructure.

SUMMARY

Throughout this specification the word "comprise", or variations such as "includes", "comprises", or "comprising", will be understood to imply the inclusion of a stated element, integer, step, or group of elements, integers, or steps, but not the exclusion of any other element, integer, step, or group of elements, integers, or steps.

The present disclosure relates to methods and systems which can enable the recordal of a payment event which may be, for example, a payment of currency in exchange for goods.

In some embodiments, there is provided a computer-implemented method of recording a asset transfer event involving at least a first user and a second user. An asset may be understood to be a representation of a physical asset using a blockchain token. An asset may be precious metal which is being represented using a blockchain token. An asset may be a tokenised asset. A tokenised asset may be an amount of currency. An asset may be a product or service. An asset transfer event may be a payment of currency for a product, item or service. The embodiment may enable a payment of currency to be recorded. The payment of currency may be in any currency or type of currency and may be for goods or services or may be in exchange for a different currency or type of currency. The embodiment may be implemented by a computing resource. The computing resource may be hardware or software implemented. The computing resource may comprise a plurality of processing resources which may be distributed either locally or over a wide geographical area. The method may comprise: receiving instruction data, the instruction data related to a requested asset transfer event, the instruction data comprising a first set of metadata related to a sender of the asset transfer and a second set of metadata related to at least one recipient of the asset transfer. The metadata may identify, for example, at least one of a currency of the payment, an account, an individual designated to receive the transfer or to make the transfer, terms and conditions for the payment and a public key or evidence of a digital signature approving the payment. The sender and the recipient may each be associated with an account associated with an asset registry. The sender of the asset may be associated with a first event stream and the recipient of the asset may be associated with a second event stream.

An asset registry is a register of assets owned by an individual or organisation. Examples of assets include any resource owned or controlled by the respective individual or organisation. Examples of assets include cash or anything else of monetary value. An example of an asset registry may be a bank which registers cash deposits against an account which can be used to fund transactions in a specific currency, for example. Another example may be a gold account which is a register of gold deposits owned by an individual. Asset registries are associated with an issuer of the asset associated with accounts managed by the asset registry. An example issuer may be the Royal Mint.

The embodiment may provide a method which may further comprise initialising a first event stream corresponding to the sender and a second event stream corresponding to the at least one recipient. The embodiment may alternatively or additionally comprise accessing a first event stream or a second event stream corresponding to the respective sender and recipient. The event streams may be implemented using any suitable hardware or data structure. The method provided by the embodiment may further comprise the step of comparing the first set of metadata and the second set of metadata to determine, in accordance with a transfer protocol, whether a transfer from the second to the at least one recipient can be made. Based on the comparison between the respective sets of metadata in accordance with the payment protocol, the method provided by the embodiment may comprise determining one or more items of correspondence between the respective sets of metadata. A transfer protocol may define at least one criterion which needs to be satisfied for enabling an asset transfer event to take place. The at least one criterion may require that the sender and the recipient are associated with an account associated with the same asset registry. For example, the at least one criterion may require that the accounts are with the same bank. The at least one criterion may require that the account is associated with an asset of the same type. For example, such a criterion may require both accounts are for pounds sterling (GBP).

An event stream may comprise a blockchain-supported append-only log wherein data recorded in a blockchain transaction is added to a log which is ordered in time. That is to say, an event stream may log data recorded on the blockchain in time order, i.e. as they appear on the blockchain. This means that the order of transactions within a block on the blockchain will be generally reflected by the corresponding index of the corresponding event logged on the event stream. However, this does not need to be the case. Two concurrent events mean that the order of the event is not reflected in the order of transactions within a block. It is possible that an event on the event stream with an index, say, N+1, may be recorded in block B, while an event with index N (i.e. recorded on the event stream before the other event) may be recorded in block B+1.

An event stream can be implemented using any suitable data structure. An event stream may comprise a series of entries which are stored in a sequence wherein each entry in the sequence is referenced in the sequence by a monotonically increasing number. That is to say, the first entry in an event stream is entry 1, the second entry is entry 2 and so on. The utilisation of an underlying blockchain means that it can be guaranteed that individual entries in the event stream have not be modified since they were written, no entries have been inserted between previously contiguous entries, no entries have been removed and no entries have been re-ordered. It is also not possible for unauthorised parties to append events to an event stream. The event stream may be off-chain, i.e. not on the blockchain. Whilst it is possible for a malicious party to add an event to an event stream, the user who has initialised the event stream will need to sign every event which is to be appended to the event stream so the instance of a malicious party trying to add an event would be detectable.

Based on the determined correspondence, for the sender and the at least one recipient, a previous blockchain transaction may be identified. The method provided by the embodiment may further comprise: generating a further blockchain transaction for the payment event, the further blockchain transaction comprising, for each of the sender and the at least one recipient, a dust input spending a dust output associated with the previous transaction and a respective unspent transaction output (UTXO) corresponding to the dust input, and an unspent transaction output associated with the transfer event; and synchronising the respective first and second event streams with the payment event.

The above method enables an asset transfer event to be recorded which can rely on the immutability of the blockchain and need not relate to a payment of cryptocurrency. The transfer can be made from one account associated with an asset registry to another account associated with an asset registry and then securely verified against an event stream which records the metadata associated with the payment.

Dust inputs generally correspond to the smallest amount of cryptocurrency that a miner is willing to process at the time. This value will change with time and is therefore understood as not be limited to a specific value. As dust inputs generally correspond to the smallest amount of cryptocurrency that a miner is willing to process, a dust input is practically indivisible as a miner is not willing to process a smaller value. This means that the dust input is practically impossible to split and it is more difficult for a malicious third party attacker to use the dust input to split a chain as nothing smaller than the dust input can be processed by the miners. In other words, the amount of cryptocurrency corresponding to a dust input can change in time and the smallest amount a miner is willing to process at any time can be used to support a dust input and maintain the security, as the chain would still be almost impossible to split because the dust input cannot be split.

In some embodiments, there may be provided a computer-implemented method of transferring an asset from a first account associated with an asset registry to a second account associated with an asset registry. The method provided by the embodiments may be implemented by a first computing resource associated with a sender of the transfer. The method provided by the embodiment may comprise receiving a request for transfer of the asset from a second computing resource configured to implement the method of the first aspect.

The method provided by the embodiment may further comprise generating a first set of metadata indicating:
(i) an asset registry associated with at least the sender account to be used for the transfer;
(ii) a value of the asset to be taken from the sender account; and
(iii) an indicator of the asset to be used for the transfer;

The method provided by the embodiment may further comprise transmitting the first set of metadata to the second computing resource to initiate the transfer; receiving instruction data related to the requested transfer from the second computing resource;
signing the instruction data using a cryptographic signature to generate signed instruction data;
transmitting the signed instruction data to the second computing resource.

To initiate the transfer, the first set of metadata may be sent to the second computing resource to request instruction data required from the user of the second computing resource.

The above method enables a computing device to enable a transfer of an asset and benefit from the immutability, confidentiality and security of the approach provided by the first aspect.

In some embodiments, there may be provided a computer-implemented method of verifying an asset transfer event recorded in accordance with the first aspect, the method implemented by a first computing resource, the method comprising:
receiving a request to verify an asset transfer event, the request comprising an identifier associated with the asset transfer event from a computing resource;
searching for an event stream entry associated with the identifier to extract metadata associated with the asset transfer event;
transmitting a confirmation of asset transfer event to a computing resource.

BRIEF DESCRIPTION OF THE DRAWINGS

Aspects and embodiments of the present disclosure will now be described, by way of example only, and with reference to the accompany drawings, in which:

FIG. 4c illustrates a plurality of event streams corresponding to the parties to a transaction;

FIG. 5c illustrates a plurality of event streams corresponding to the parties to a transaction;

DETAILED DESCRIPTION

Figure 1A:
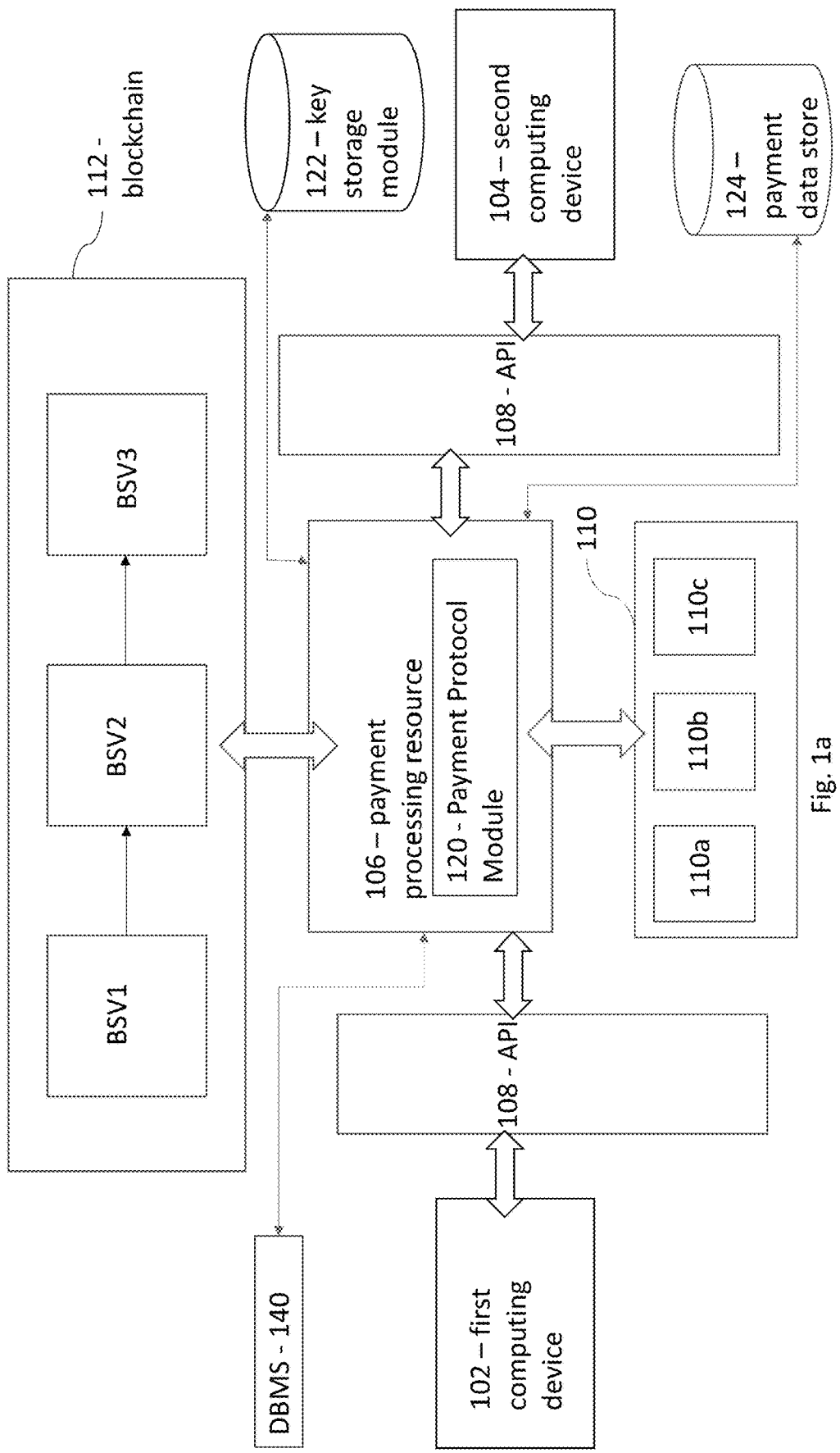
FIG. 1a illustrates a system in accordance with an embodiment.

We now provide a detailed discussion of aspects and embodiments of the present disclosure to provide the reader with a full and complete understanding of the present disclosure.

Viewed from a first aspect, there is provided a computer-implemented method of recording a asset transfer event involving at least a first user and a second user. The method may enable a payment of currency to be recorded. The payment of currency can be in any currency and may be for goods or services. The method may be implemented by a computing resource. The computing resource may be hardware or software implemented. The computing resource may comprise a plurality of processing resources which may be distributed either locally or over a wide geographical area. The method may comprise: receiving instruction data, the instruction data related to a requested asset transfer event, the instruction data comprising a first set of metadata related to a sender of the payment and a second set of metadata related to at least one recipient of the payment. The metadata may identify at least one of a currency of the payment, an account associated with an asset registry, an individual designated to receive the payment or to make the payment, terms and conditions for the payment and a public key or evidence of a digital signature approving the payment. Each of the sender and the recipient may each be associated with an account associated with an asset registry;

The sender of the asset may be associated with with a first event stream and the recipient of the asset may be associated with a second event stream. Association with an event stream may mean that a user holds cryptographic keys which enable a user to append data to that event stream and/or it may mean that a user can initialise and/or terminate an event stream to which data can be appended by the user or a computing resource operated by the user. The initialisation of an event stream may comprise the configuration of the computing resources necessary for implementing the event stream.

The method may further comprise initialising a first event stream corresponding to the sender and a second event stream corresponding to the at least one recipient. The event streams may be implemented using any suitable hardware or data structure. The method may further comprise retrieving details of a first event stream corresponding to the sender and/or retrieving details of a second event stream corresponding to the at least one recipient.

The method may further comprise:
comparing the first set of metadata and the second set of metadata to determine, in accordance with a transfer protocol, whether a transfer from the sender to the at least one recipient can be made. based on the comparison between the respective sets of metadata in accordance with the transfer protocol, determining one or more items of correspondence between the respective sets of metadata and based on the determined correspondence, for the sender and the at least one recipient The method may further comprise identifying at least one previous blockchain transaction, wherein said previous blockchain transaction may comprise dust outputs. A previous blockchain transaction may be identified for the sender and the recipient. Blockchain transactions may also be identified for the asset registries and the issuers of the asset associated with the accounts corresponding to the sender and recipient.

The method may further comprise:
generating a further blockchain transaction for the asset transfer event, the further blockchain transaction comprising, for each of the sender and the at least one recipient, a dust input spending a dust output associated with the previous transaction and a respective unspent transaction output (UTXO) which may correspond to the dust input (i.e. be at matching indices in the transaction), and an unspent transaction output associated with the asset transfer event; and synchronising the respective first and second event streams with the asset transfer event.

Advantageously, a method in accordance with the first aspect enables an asset transfer event to be recorded. The recordal is logged in a data stream which is associated with a blockchain and therefore the recordal of the asset transfer event can rely on the immutability of the blockchain and need not relate to a payment of cryptocurrency. The transfer can be made from one account to another and then be securely verified against an event stream which records the metadata associated with the payment.

Optionally, based on the comparison between the respective sets of metadata in accordance with the transfer protocol, the method may comprise determining correspondence between at least one of;
i) the identity of the asset identified in the respective sets of metadata;
ii) the value of the asset being transferred from an account corresponding to the sender and the value of asset requested from an account corresponding to the recipient; and
iii) identifiers of the asset registry associated with the sender and recipient accounts.

An example of the asset registry may be a bank, a gold repository or another registry where ownership of assets is detailed. Determining correspondence between the identity of the asset may comprise determining that the currency used by the sender and the receiver are identical. Determining correspondence between the value of the asset being transferred may comprise determining that the amount of currency paid from the recipient account is equal to the amount of currency being paid to the sender account or vice versa. Determining correspondence between the identifiers of the asset registry may comprise determining that the sender and recipient bank are identical or that the precious metal mint (e.g gold repository at The Royal Mint) is being used as the registry for the precious metal accounts of both the sender and the recipient.

Advantageously, this enables transfers of assets to only be recorded if correspondence can be determined between at least one of the identity of the asset, the amount of the asset and the identification of the party providing the asset registry. This means that the method only records transfers on which the terms of transfer are consistent.

Optionally, the further blockchain transaction may be a rendezvous blockchain transaction to synchronise a plurality of event streams, the transaction comprising at least one data carrier comprising metadata associated with the asset transfer event. The data carrier may comprise a hash of the metadata associated with the asset transfer event.

A rendezvous transaction is a blockchain transaction which may comprise a plurality of dust chain input/output pairs and an output marked with with an OP_RETURN opcode to make the output invalid and to enable the addition of a data carrier. An OP_RETURN opcode causes the immediate end of the execution of the corresponding redeem script and makes it invalid, i.e. the output cannot be redeemed. This means the output cannot be spent and the data carrier remains on the blockchain as part of the rendezvous transaction. The dust chain input/output pair may have the same index in the transaction and may respectively proceed the input funds and the change output. The data carrier may be the final output. The plurality of dust chain inputs which form the rendezvous transaction may be from different respective event streams.

Advantageously, the effect of this is that multiple parties to the transaction can be integrated into the method by the resource and each benefits from the immutability of the blockchain to record the transaction on their respective event streams without compromising on security or confidentiality. By using a hash of the metadata, the metadata of the transaction can be proved without exposing the detail of the transaction to malicious actors. Given that two different sets of metadata will not generate the same hash, this means the asset transfer event can be verified by a party who wishes to show that data which generates the hash of the metadata exists on the blockchain.

Optionally, synchronising the respective first and second event streams with the asset transfer event using a rendezvous transaction comprises appending a representation of the metadata associated with the asset transfer event to each of the respective first and second event streams.

Advantageously, this means that the representation of the metadata can be used to verify the payment has taken place. The representation of the metadata may be a hash of the metadata. The effect of using a hash of the metadata means the transfer can be recorded without compromising on confidentiality.

Optionally, the at least one data carrier is assigned to an invalid output of the further blockchain transaction. That is to say, the invalid output may comprise a redeem script which comprises an OP_RETURN opcode to ensure the output can never be redeemed but that the data carrier remains in the transaction. Advantageously, this enables the data contained in the data carrier to be stored in the corresponding transaction.

Each of the data carriers may hold a distinct dataDigest. A dataDigest is a hash of the event data as it is stored off-chain and/or as it is stored on the transaction in the event data representation of the payload of the data carrier.

Each of the data carriers may hold a distinct streamDigest. A streamDigest is a hash of a preimage of the preceding state of the event stream (which can also be described as the stream digest of the preceding state of the event stream, or the stream digest reference) or a seed of the first transaction (if the transaction is the second transaction in the chain as the first transaction does not comprise a streamDigest). The streamDigest of a hash of the preimage.

Optionally, the streamDigest may also be salted. A salt, which is a unique value, may be randomly generated for each transaction associated with an event stream. The salt is optionally stored off-chain. Salting data provides the advantage of revealing nothing and preventing brute force preimage attacks, such as brain wallet attacks.

Each of the data carriers for all of the parties may be identical and based on the same data and based on the same payment instruction dataset. The data carrier may hold some different data based on the streamState for the specific data stream the carrier is being appended to, the streamState is based on the previous streamState and/or index (or sequence number) and/or the individual salt which is used for the notaisation of that data carrier.

The streamState may be defined as a parameter which refers to the current cumulative state of all data in the corresponding event stream. It may be expressed as a digest that incorporates all message data, and the position of each data item in the stream. When the streamState is recorded on-chain, it may be accompanied by the preimage of the latest linked event and, optionally, the data item itself.

The streamState may be maintained as each event is appended to the stream. The digest, together with individual event data, may be settled on-chain according to the values of settleStreamOnChain and settleDataOnChain.

The preimage optionally comprises any one or more of the following fields:

$txid_{create}$: A reference to the first transaction in the chain, preferably the transaction id of the first transaction in the chain, index: An index of the data or event, whenRecorded: A time associated with the creation of the transaction and/or data item, $dataDigest_n$: A hash of the event data as it is stored off-chain (and optionally stored on the transaction in the event data representation of the payload ([ . . . ]), and $streamDigest_{n-1}$: A hash of the preimage of the preceding state of the event stream (also described as the stream digest of the preceding state of the event stream, or the stream digest reference) or a seed of the first transaction (if the transaction is the second transaction in the chain as the first transaction does not comprise a streamDigest).

The stream digest (streamDigest) is a hash of the preimage (preimage).

Optionally, the computing resource determines, in accordance with the transfer protocol, that the transfer cannot be made; and generates a further set of metadata to resolve the lack of concordance with the transfer protocol. A lack of concordance may be inconsistency between the identification of the asset, identification of the asset registry or the amounts being transferred. The effect of this is that the computing resource can introduce further metadata to facilitate the transfer even if there is inconsistency between at least one of the identification of the asset, the asset registry (e.g. the bank) or the amount of the asset being transferred The generation of a further set of metadata may comprise generating further payment instruction data comprising details of asset transfers (e.g. payments) from and/or to asset registries and/or conversions between assets and/or payment details to address inconsistencies in the amount in the value of the asset being transferred. The generation of a further set of metadata may also comprise retrieving cryptographic signatures corresponding to asset registries or issuers of assets.

For example, the generation of the further set of metadata comprises generating a metadata enabling conversion between a first currency and a second currency. Metadata enabling conversion between a first currency and a second currency may comprise data detailing a payment of a first currency to an asset registry associated with an issuer of the first currency and/or data detailing a payment of a second currency from an asset registry associated with an issuer of the second currency. This would enable multi-currency transactions, i.e. those across borders, to be recorded in accordance with the aspect.

For example, wherein the generation of the further set of metadata comprises generating metadata enabling transfer of an asset even where there are different issuers of the asset.

Optionally, the method may further comprise identifying a previous blockchain transaction for the asset registries and/or the issuers of the asset. These blockchain transactions comprise a dust input spending a dust output associated with the respective previous transaction.

The method may further comprise initialising an event stream in association with the computing resource or any of the asset registries; and synchronising the asset transfer event with the event stream associated with the computing resource. Optionally, the synchronisation of the asset transfer event with the event stream associated with the computing resource or asset registry may comprise appending a representation of the metadata corresponding to the asset transfer event to the event stream associated with the asset registry or computing resource.

Advantageously, this means the asset registries can also verify the payment using the event stream, i.e. the involvement of the asset registries is supported by the immutability of the blockchain. That is to say, a provider of an account, such as, for example, a bank, can verify that an asset transfer has been made as they also have an event stream which is appended to record the asset transfer. Additionally or alternatively, an event stream in association with the computing resource can also be initialised to record the transactions which involve the computing resource.

The initialisation of an event stream may mean the set-up and configuration of the computing resources and data structures which are required to implement the particular event stream.

Optionally, the computing resource applies a cryptographic signature to the further set of metadata. The cryptographic signature may be generated using the public key infrastructure (PKI) techniques. The cryptographic signature may be retrieved from a data store on from a device operated by either the sender or recipient. Optionally, the computing resource may retrieve cryptographic signatures corresponding to the sender and the recipient and applies the respective cryptographic signatures to the metadata. The respective cryptographic signatures may be, for example, retrieved from computing devices associated with the sender and the recipient.

The advantageous effect of this is the computing resource can apply a signature to the further set of metadata to enable the further set of metadata to be cryptographically signed.

In a second aspect, there is provided a computer-implemented method of transferring an asset from a first user to a second user. The accounts may be provided by an asset registry such as, for example, a bank. The method may be implemented by a first computing resource associated with a sender of the transferred asset. The computing resource may be hardware or software implemented. The computing resource may comprise a plurality of processing resources which may be distributed either locally or over a wide geographical area. The method may comprise receiving a request for transfer of a asset from a second computing resource configured to implement the method of the first aspect. The method may comprise generating a first set of metadata indicating:

(i) an account to be used for the transfer;
(ii) an amount of asset to be taken from the account; and
(iii) an indicator of the asset to be used in the transfer;

The method may further comprise transmitting the first set of metadata to the second computing resource to initialise the transfer. The method may further comprise receiving instruction data related to the requested transfer from the second computing resource. The method may further comprise signing the instruction data using a cryptographic signature to generate signed instruction data. The method may further comprise transmitting the signed instruction data to the second computing resource.

A method in accordance with the second aspect enables a computing device to enable a user to make a transfer of a asset and benefit from the immutability, confidentiality and security of the approach provided by the first aspect.

A method in accordance with a third aspect may comprise a computer-implemented method of verifying a asset transfer event recorded in accordance with the first aspect. The method may be implemented by a first computing resource which may be hardware or software defined. The method may comprise receiving a request to verify an asset transfer event comprising an identifier associated with the asset transfer event from the computing resource. The method may further comprise searching for an event stream entry associated with the identifier to extract metadata associated with the asset transfer event. The method may further comprise transmitting a confirmation of the asset transfer event to a computing resource.

A method in accordance with the third aspect enables the occurrence of a asset transfer event to be verified by submitting an identifier associated with the event which is used as the basis for a search and then verifying the occurrence when an event associated with the identifier is found.

Specific embodiments are now described by way of illustration with reference to the accompanying drawings, in which like reference numerals refer to like features.

System Overview

We now describe, with reference to FIG. 1a, a system 100 which enables a transfer of an asset between a first user and second user of the system 100 to be recorded.

System 100 comprises first computing device 102 and second computing device 104. First computing device 102 and second computing device 104 may be any computing resource. Each of first computing device 102 and second computing device 104 are configured to interact with payment processing resource 106 via respective first and second application programming interface (API) 108.

The payment processing resource 106 is configured to initialise and/or interact with event streams provided in respect of at least each of the first user named Alice (110a), the second user named Bob (110b) and the payment processing resource (110c) using the event stream resource 110. The initialisation and interaction with an event stream by the payment processing resource 106 will be understood from UK Patent Application No. 2102314.8 filed on 18 Feb. 2021 in the name of nChain Holdings Limited.

The payment processing resource 106 is further configured to interact with the blockchain 112. The blockchain 112 may comprise at least one public proof-of-work blockchain in accordance with the Bitcoin Satoshi Vision (BSV) protocol in that it is an append-only ledger of blocks (BSV1, BSV2, BSV3) which are made up of transactions.

Figure 1B:
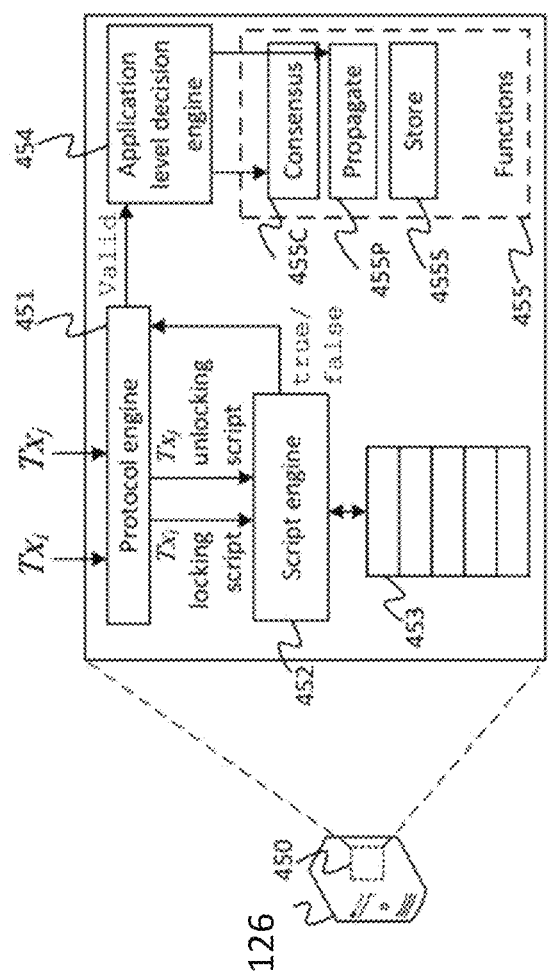
FIG. 1b illustrates a node configured to implement the Bitcoin software in order to validate a blockchain transaction.
Figure 1C:
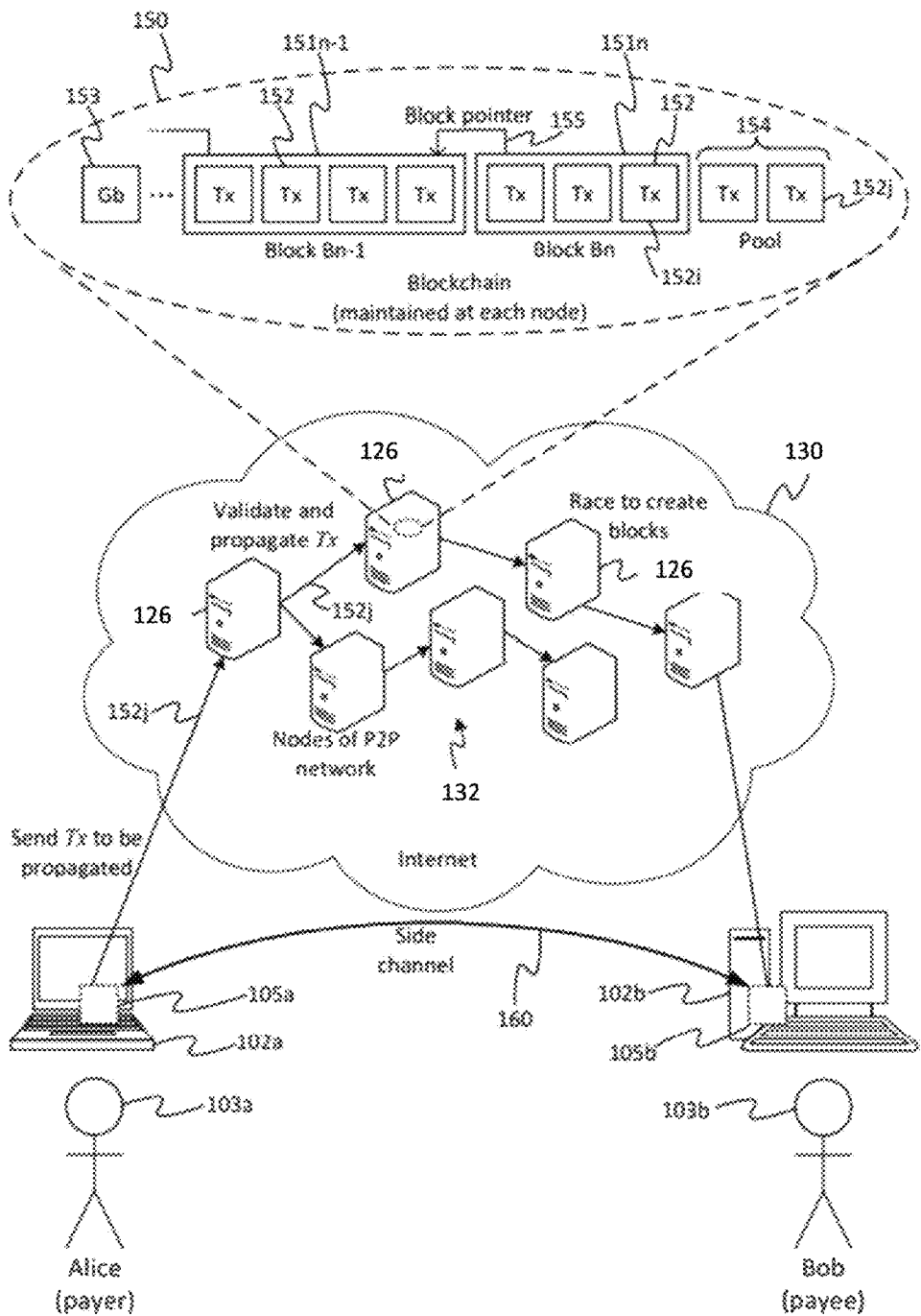
FIG. 1c illustrates a blockchain network.

The blockchain 112 comprises a plurality of nodes 126 configured by the software which is now described in relation to FIG. 1b. Each node is configured in accordance with this software as part of the blockchain as described below in relation to FIG. 1c FIG. 1b illustrates an example of the node software 450 that is run on each blockchain node 126 of the network 132, in the example of a UTXO- or output-based model. Note that another entity may run node software 450 without being classed as a node 126 on the network 132, i.e. without performing the actions required of a node 126. The node software 450 may contain, but is not limited to, a protocol engine 451, a script engine 452, a stack 453, an application-level decision engine 454, and a set of one or more blockchain-related functional modules 455. Each node 126 may run node software that contains, but is not limited to, all three of: a consensus module 455C (for example, proof-of-work), a propagation module 455P and a storage module 455S (for example, a database). The protocol engine 401 is typically configured to recognize the different fields of a transaction 152 and process them in accordance with the node protocol. When a transaction 152j ($Tx_j$) is received having an input pointing to an output (e.g. UTXO) of another, preceding transaction 152i ($Tx_{m-1}$), then the protocol engine 451 identifies the unlocking script in $Tx_j$ and passes it to the script engine 452. The protocol engine 451 also identifies and retrieves $Tx_i$ based on the pointer in the input of $Tx_j$. $Tx_i$ may be published on the blockchain 150, in which case the protocol engine may retrieve $Tx_i$ from a copy of a block 151 of the blockchain 150 stored at the node 126. Alternatively, $Tx_i$ may yet to have been published on the blockchain 150. In that case, the protocol engine 451 may retrieve $Tx_i$ from the ordered set 154 of unpublished transactions maintained by the node 126. Either way, the script engine 451 identifies the locking script in the referenced output of $Tx_i$ and passes this to the script engine 452.

Figure 2:
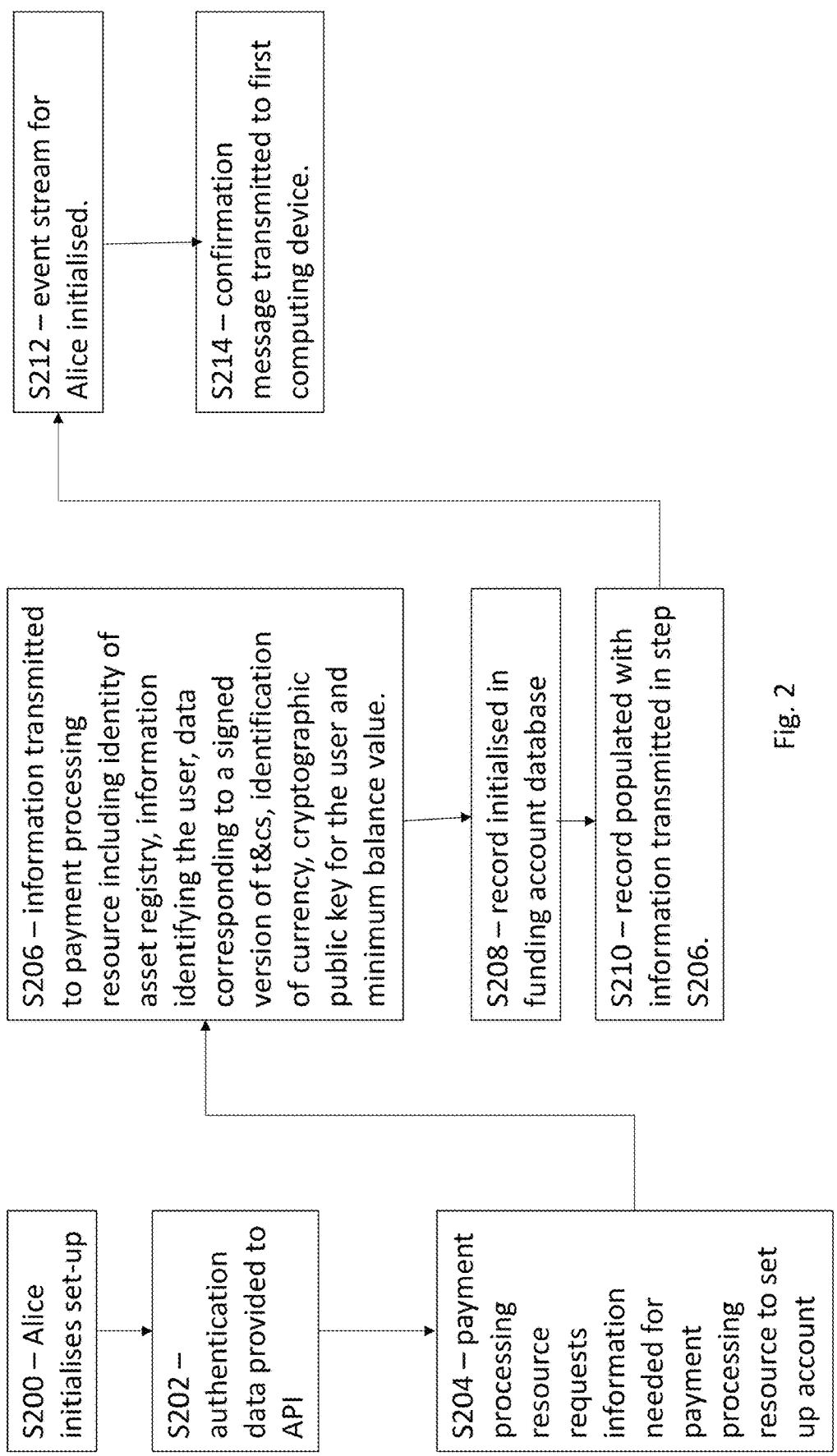
FIG. 2 illustrates a flow chart detailing the set-up of an account in accordance with the embodiment.

The script engine 452 thus has the locking script of $Tx_i$ and the unlocking script from the corresponding input of $Tx_j$. For example, transactions labelled $Tx_0$ and $Tx_1$ are illustrated in FIG. 2, but the same could apply for any pair of transactions. The script engine 452 runs the two scripts together as discussed previously, which will include placing data onto and retrieving data from the stack 453 in accordance with the stack-based scripting language being used (e.g. Script).

By running the scripts together, the script engine 452 determines whether or not the unlocking script meets the one or more criteria defined in the locking script—i.e. does it "unlock" the output in which the locking script is included? The script engine 452 returns a result of this determination to the protocol engine 451. If the script engine 452 determines that the unlocking script does meet the one or more criteria specified in the corresponding locking script, then it returns the result "true". Otherwise it returns the result "false".

In an output-based model, the result "true" from the script engine 452 is one of the conditions for validity of the transaction. Typically there are also one or more further, protocol-level conditions evaluated by the protocol engine 451 that must be met as well; such as that the total amount of digital asset specified in the output(s) of $Tx_j$ does not exceed the total amount pointed to by its inputs, and that the pointed-to output of $Tx_i$ has not already been spent by another valid transaction. The protocol engine 451 evaluates the result from the script engine 452 together with the one or more protocol-level conditions, and only if they are all true does it validate the transaction $Tx_j$. The protocol engine 451 outputs an indication of whether the transaction is valid to the application-level decision engine 454. Only on condition that $Tx_j$ is indeed validated, the decision engine 454 may select to control both of the consensus module 455C and the propagation module 455P to perform their respective blockchain-related function in respect of $Tx_j$. This comprises the consensus module 455C adding $Tx_j$ to the node's respective ordered set of transactions 154 for incorporating in a block 151, and the propagation module 455P forwarding $Tx_j$ to another blockchain node 126 in the network 106. Optionally, in embodiments the application-level decision engine 454 may apply one or more additional conditions before triggering either or both of these functions. E.g. the decision engine may only select to publish the transaction on condition that the transaction is both valid and leaves enough of a transaction fee.

Note also that the terms "true" and "false" herein do not necessarily limit to returning a result represented in the form of only a single binary digit (bit), though that is certainly one possible implementation. More generally, "true" can refer to any state indicative of a successful or affirmative outcome, and "false" can refer to any state indicative of an unsuccessful or non-affirmative outcome. For instance in an account-based model, a result of "true" could be indicated by a combination of an implicit, protocol-level validation of a signature and an additional affirmative output of a smart contract (the overall result being deemed to signal true if both individual outcomes are true).

Other variants or use cases of the disclosed techniques may become apparent to the person skilled in the art once given the disclosure herein. The scope of the disclosure is not limited by the described embodiments but only by the accompanying claims.

For instance, some embodiments above have been described in terms of a bitcoin network 106, bitcoin blockchain 150 and bitcoin nodes 126. However, it will be appreciated that the bitcoin blockchain is one particular example of a blockchain 150 and the above description may apply generally to any blockchain. That is, the present invention is in by no way limited to the bitcoin blockchain. More generally, any reference above to bitcoin network 106, bitcoin blockchain 150 and bitcoin nodes 126 may be replaced with reference to a blockchain network 106, blockchain 150 and blockchain node 126 respectively. The blockchain, blockchain network and/or blockchain nodes may share some or all of the described properties of the bitcoin blockchain 150, bitcoin network 106 and bitcoin nodes 126 as described above.

In preferred embodiments of the invention, the blockchain network 132 is the bitcoin network and bitcoin nodes 126 perform at least all of the described functions of creating, publishing, propagating and storing blocks 151 of the blockchain 150. It is not excluded that there may be other network entities (or network elements) that only perform one or some but not all of these functions. That is, a network entity may perform the function of propagating and/or storing blocks without creating and publishing blocks (recall that these entities are not considered nodes of the preferred bitcoin network 132).

In non-preferred embodiments of the invention, the blockchain network 132 may not be the bitcoin network. In these embodiments, it is not excluded that a node may perform at least one or some but not all of the functions of creating, publishing, propagating and storing blocks 151 of the blockchain 150. For instance, on those other blockchain networks a "node" may be used to refer to a network entity that is configured to create and publish blocks 151 but not store and/or propagate those blocks 151 to other nodes.

Even more generally, any reference to the term "bitcoin node" 126 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 126.

Even more generally, any reference to the term "bitcoin node" 126 above may be replaced with the term "network entity" or "network element", wherein such an entity/element is configured to perform some or all of the roles of creating, publishing, propagating and storing blocks. The functions of such a network entity/element may be implemented in hardware in the same way described above with reference to a blockchain node 126.

FIG. 1c shows an example system 100 for implementing a blockchain 150. The system 100 may comprise of a packet-switched network 130, typically a wide-area internetwork such as the Internet. The packet-switched network 130 comprises a plurality of blockchain nodes 126 that may be arranged to form a peer-to-peer (P2P) network 132 within the packet-switched network 130. Whilst not illustrated, the blockchain nodes 126 may be arranged as a near-complete graph. Each blockchain node 126 is therefore highly connected to other blockchain nodes 126.

Each blockchain node 126 comprises computer equipment of a peer, with different ones of the nodes 126 belonging to different peers. Each blockchain node 126 comprises processing apparatus comprising one or more processors, e.g. one or more central processing units (CPUs), accelerator processors, application specific processors and/or field programmable gate arrays (FPGAs), and other equipment such as Application Specific Integrated Circuits (ASICs). Each node also comprises memory, i.e. computer-readable storage in the form of a non-transitory computer-readable medium or media. The memory may comprise one or more memory units employing one or more memory media, e.g. a magnetic medium such as a hard disk; an electronic medium such as a solid-state drive (SSD), flash memory or EEPROM; and/or an optical medium such as an optical disk drive.

The blockchain 150 comprises a chain of blocks of data 151, wherein a respective copy of the blockchain 150 is maintained at each of a plurality of blockchain nodes 126 in the distributed or blockchain network 130. As mentioned above, maintaining a copy of the blockchain 150 does not necessarily mean storing the blockchain 150 in full. Instead, the blockchain 150 may be pruned of data so long as each blockchain node 150 stores the blockheader (discussed below) of each block 151. Each block 151 in the chain comprises one or more transactions 152, wherein a transaction in this context refers to a kind of data structure. The nature of the data structure will depend on the type of transaction protocol used as part of a transaction model or scheme. A given blockchain will use one particular transaction protocol throughout. In one common type of transaction protocol, the data structure of each transaction 152 comprises at least one input and at least one output. Each output specifies an amount representing a quantity of a digital asset as property, an example of which is a user 103 to whom the output is cryptographically locked (requiring a signature or other solution of that user in order to be unlocked and thereby redeemed or spent). Each input points back to the output of a preceding transaction 152, thereby linking the transactions.

Each block 151 also comprises a block pointer 155 pointing back to the previously created block 151 in the chain so as to define a sequential order to the blocks 151. Each transaction 152 (other than a coinbase transaction) comprises a pointer back to a previous transaction so as to define an order to sequences of transactions (N.B. sequences of transactions 152 are allowed to branch). The chain of blocks 151 goes all the way back to a genesis block (Gb) 153 which was the first block in the chain. One or more original transactions 152 early on in the chain 150 pointed to the genesis block 153 rather than a preceding transaction.

Each of the blockchain nodes 126 is configured to forward transactions 152 to other blockchain nodes 126, and thereby cause transactions 152 to be propagated throughout the network 132. Each blockchain node 126 is configured to create blocks 151 and to store a respective copy of the same blockchain 150 in their respective memory. Each blockchain node 126 also maintains an ordered set 154 of transactions 152 waiting to be incorporated into blocks 151. The ordered set 154 is often referred to as a "mempool". This term herein is not intended to limit to any particular blockchain, protocol or model. It refers to the ordered set of transactions which a node 126 has accepted as valid and for which the node 126 is obliged not to accept any other transactions attempting to spend the same output.

In a given present transaction 152*j*, the (or each) input comprises a pointer referencing the output of a preceding transaction 152*i* in the sequence of transactions, specifying that this output is to be redeemed or "spent" in the present transaction 152*j*. In general, the preceding transaction could be any transaction in the ordered set 154 or any block 151. The preceding transaction 152*i* need not necessarily exist at the time the present transaction 152*j* is created or even sent to the network 132, though the preceding transaction 152*i* will need to exist and be validated in order for the present transaction to be valid. Hence "preceding" herein refers to a predecessor in a logical sequence linked by pointers, not necessarily the time of creation or sending in a temporal sequence, and hence it does not necessarily exclude that the transactions 152*i*, 152*j* be created or sent out-of-order (see discussion below on orphan transactions). The preceding transaction 152*i* could equally be called the antecedent or predecessor transaction.

The input of the present transaction 152*j* also comprises the input authorisation, for example the signature of the user 103*a* to whom the output of the preceding transaction 152*i* is locked. In turn, the output of the present transaction 152*j* can be cryptographically locked to a new user or entity 103*b*. The present transaction 152*j* can thus transfer the amount defined in the input of the preceding transaction 152*i* to the new user or entity 103*b* as defined in the output of the present transaction 152*j*. In some cases a transaction 152 may have multiple outputs to split the input amount between multiple users or entities (one of whom could be the original user or entity 103*a* in order to give change). In some cases a transaction can also have multiple inputs to gather together the amounts from multiple outputs of one or more preceding transactions, and redistribute to one or more outputs of the current transaction.

According to an output-based transaction protocol such as bitcoin, when an entity, such as a user or machine, 103 wishes to enact a new transaction 152*j*, then the entity sends the new transaction from its computer terminal to a recipient. The entity or the recipient will eventually send this transaction to one or more of the blockchain nodes 126 of the network 132 (which nowadays are typically servers or data centres, but could in principle be other user terminals). It is also not excluded that the entity 103 enacting the new transaction 152j could send the transaction to one or more of the blockchain nodes 126 and, in some examples, not to the recipient. A blockchain node 126 that receives a transaction checks whether the transaction is valid according to a blockchain node protocol which is applied at each of the blockchain nodes 126. The blockchain node protocol typically requires the blockchain node 126 to check that a cryptographic signature in the new transaction 152j matches the expected signature, which depends on the previous transaction 152i in an ordered sequence of transactions 152. In such an output-based transaction protocol, this may comprise checking that the cryptographic signature or other authorisation of the entity 103 included in the input of the new transaction 152j matches a condition defined in the output of the preceding transaction 152i which the new transaction assigns, wherein this condition typically comprises at least checking that the cryptographic signature or other authorisation in the input of the new transaction 152j unlocks the output of the previous transaction 152i to which the input of the new transaction is linked to. The condition may be at least partially defined by a script included in the output of the preceding transaction 152i. Alternatively it could simply be fixed by the blockchain node protocol alone, or it could be due to a combination of these. Either way, if the new transaction 152j is valid, the blockchain node 126 forwards it to one or more other blockchain nodes 126 in the blockchain network 132. These other blockchain nodes 126 apply the same test according to the same blockchain node protocol, and so forward the new transaction 152j on to one or more further nodes 126, and so forth. In this way the new transaction is propagated throughout the network of blockchain nodes 126.

In an output-based model, the definition of whether a given output (e.g. UTXO) is assigned is whether it has yet been validly redeemed by the input of another, onward transaction 152j according to the blockchain node protocol. Another condition for a transaction to be valid is that the output of the preceding transaction 152i which it attempts to assign or redeem has not already been assigned/redeemed by another transaction. Again if not valid, the transaction 152j will not be propagated (unless flagged as invalid and propagated for alerting) or recorded in the blockchain 150. This guards against double-spending whereby the transactor tries to assign the output of the same transaction more than once. An account-based model on the other hand guards against double-spending by maintaining an account balance. Because again there is a defined order of transactions, the account balance has a single defined state at any one time.

In addition to validating transactions, blockchain nodes 126 also race to be the first to create blocks of transactions in a process commonly referred to as mining, which is supported by "proof-of-work". At a blockchain node 126, new transactions are added to an ordered set 154 of valid transactions that have not yet appeared in a block 151 recorded on the blockchain 150. The blockchain nodes then race to assemble a new valid block 151 of transactions 152 from the ordered set of transactions 154 by attempting to solve a cryptographic puzzle. Typically this comprises searching for a "nonce" value such that when the nonce is concatenated with a representation of the ordered set of transactions 154 and hashed, then the output of the hash meets a predetermined condition. E.g. the predetermined condition may be that the output of the hash has a certain predefined number of leading zeros. Note that this is just one particular type of proof-of-work puzzle, and other types are not excluded. A property of a hash function is that it has an unpredictable output with respect to its input. Therefore this search can only be performed by brute force, thus consuming a substantive amount of processing resource at each blockchain node 126 that is trying to solve the puzzle.

The first blockchain node 126 to solve the puzzle announces this to the network 132, providing the solution as proof which can then be easily checked by the other blockchain nodes 126 in the network (once given the solution to a hash it is straightforward to check that it causes the output of the hash to meet the condition). The first blockchain node 126 propagates a block to a threshold consensus of other nodes that accept the block and thus enforce the protocol rules. The ordered set of transactions 154 then becomes recorded as a new block 151 in the blockchain 150 by each of the blockchain nodes 126. A block pointer 155 is also assigned to the new block 151n pointing back to the previously created block 151n-1 in the chain. A significant amount of effort, for example in the form of hash, required to create a proof-of-work solution signals the intent of the first node 126 to follow the rules of the blockchain protocol. Such rules include not accepting a transaction as valid if it assigns the same output as a previously validated transaction, otherwise known as double-spending. Once created, the block 151 cannot be modified since it is recognized and maintained at each of the blockchain nodes 126 in the blockchain network 132. The block pointer 155 also imposes a sequential order to the blocks 151. Since the transactions 152 are recorded in the ordered blocks at each blockchain node 126 in a network 132, this therefore provides an immutable public ledger of the transactions.

Note that different blockchain nodes 126 racing to solve the puzzle at any given time may be doing so based on different snapshots of the ordered set of yet to be published transactions 154 at any given time, depending on when they started searching for a solution or the order in which the transactions were received. Whoever solves their respective puzzle first defines which transactions 152 are included in the next new block 151n and in which order, and the current set 154 of unpublished transactions is updated. The blockchain nodes 126 then continue to race to create a block from the newly defined outstanding ordered set of unpublished transactions 154, and so forth. A protocol also exists for resolving any "fork" that may arise, which is where two blockchain nodes 126 solve their puzzle within a very short time of one another such that a conflicting view of the blockchain gets propagated between nodes 126. In short, whichever prong of the fork grows the longest becomes the definitive blockchain 150. Note this should not affect the users or agents of the network as the same transactions will appear in both forks.

According to the bitcoin blockchain (and most other blockchains) a node that successfully constructs a new block 126 is granted the ability to assign an accepted amount of the digital asset in a new special kind of transaction which distributes a defined quantity of the digital asset (as opposed to an inter-agent, or inter-user transaction which transfers an amount of the digital asset from one agent or user to another). This special type of transaction is usually referred to as a "coinbase transaction", but may also be termed an "initiation transaction". It typically forms the first transaction of the new block 151n. The proof-of-work signals the intent of the node that constructs the new block to follow the protocol rules allowing this special transaction to be redeemed later. The blockchain protocol rules may require a maturity period, for example 100 blocks, before this special transaction may be redeemed. Often a regular (non-generation) transaction 152 will also specify an additional transaction fee in one of its outputs, to further reward the blockchain node 126 that created the block 151n in which that transaction was published. This fee is normally referred to as the "transaction fee", and is discussed blow.

Due to the resources involved in transaction validation and publication, typically at least each of the blockchain nodes 126 takes the form of a server comprising one or more physical server units, or even whole a data centre. However in principle any given blockchain node 126 could take the form of a user terminal or a group of user terminals networked together.

The memory of each blockchain node 126 stores software configured to run on the processing apparatus of the blockchain node 126 in order to perform its respective role or roles and handle transactions 152 in accordance with the blockchain node protocol. It will be understood that any action attributed herein to a blockchain node 126 may be performed by the software run on the processing apparatus of the respective computer equipment. The node software may be implemented in one or more applications at the application layer, or a lower layer such as the operating system layer or a protocol layer, or any combination of these.

Also connected to the network 130 is the computer equipment of each of a plurality of parties 103 in the role of consuming users. These users may interact with the blockchain network but do not participate in validating, constructing or propagating transactions and blocks. Some of these users or agents 103 may act as senders and recipients in transactions. Other users may interact with the blockchain 150 without necessarily acting as senders or recipients. For instance, some parties may act as storage entities that store a copy of the blockchain 150 (e.g. having obtained a copy of the blockchain from a blockchain node 126).

Some or all of the parties 103 may be connected as part of a different network, e.g. a network overlaid on top of the blockchain network 132. Users of the blockchain network (often referred to as "clients") may be said to be part of a system that includes the blockchain network; however, these users are not blockchain nodes 126 as they do not perform the roles required of the blockchain nodes. Instead, each party 103 may interact with the blockchain network 132 and thereby utilize the blockchain 150 by connecting to (i.e. communicating with) a blockchain node 132. Two parties 103 and their respective equipment are shown for illustrative purposes: a first party 103a and his/her respective computer equipment 102a, and a second party 103b and his/her respective computer equipment 102b. First computing device 102 and second computing device 104 may be configured to implement any of the functionality of respective computer equipment 102a or 102b. It will be understood that many more such parties 103 and their respective computer equipment may be present and participating in the system 100, but for convenience they are not illustrated. Each party 103 may be an individual or an organization. Purely by way of illustration the first party 103a is referred to herein as Alice and the second party 103b is referred to as Bob, but it will be appreciated that this is not limiting and any reference herein to Alice or Bob may be replaced with "first party" and "second "party" respectively.

The computer equipment of each party 103 comprises respective processing apparatus comprising one or more processors, e.g. one or more CPUs, CPUs, other accelerator processors, application specific processors, and/or FPGAs. The computer equipment of each party 103 further comprises memory, i.e. computer-readable storage in the form of a non-transitory computer-readable medium or media. This memory may comprise one or more memory units employing one or more memory media, e.g. a magnetic medium such as hard disk; an electronic medium such as an SSD, flash memory or EEPROM; and/or an optical medium such as an optical disc drive. The memory on the computer equipment of each party 103 stores software comprising a respective instance of at least one client application 105 arranged to run on the processing apparatus. It will be understood that any action attributed herein to a given party 103 may be performed using the software run on the processing apparatus of the respective computer equipment. The computer equipment of each party 103 comprises at least one user terminal, e.g. a desktop or laptop computer, a tablet, a smartphone, or a wearable device such as a smartwatch. The computer equipment of a given party 103 may also comprise one or more other networked resources, such as cloud computing resources accessed via the user terminal.

The client application 105 may be initially provided to the computer equipment of any given party 103 on suitable computer-readable storage medium or media, e.g. downloaded from a server, or provided on a removable storage device such as a removable SSD, flash memory key, removable EEPROM, removable magnetic disk drive, magnetic floppy disk or tape, optical disk such as a CD or DVD ROM, or a removable optical drive, etc. Client application 105 corresponds respectively to 105a and 105b on the devices 102a and 102b illustrated in FIG. 1c The client application 105 comprises at least a "wallet" function. This has two main functionalities. One of these is to enable the respective party 103 to create, authorise (for example sign) and send transactions 152 to one or more bitcoin nodes 126 to then be propagated throughout the network of blockchain nodes 126 and thereby included in the blockchain 150. The other is to report back to the respective party the amount of the digital asset that he or she currently owns. In an output-based system, this second functionality comprises collating the amounts defined in the outputs of the various 152 transactions scattered throughout the blockchain 150 that belong to the party in question.

Note: whilst the various client functionality may be described as being integrated into a given client application 105, this is not necessarily limiting and instead any client functionality described herein may instead be implemented in a suite of two or more distinct applications, e.g. interfacing via an API, or one being a plug-in to the other. More generally the client functionality could be implemented at the application layer or a lower layer such as the operating system, or any combination of these. The following will be described in terms of a client application 105 but it will be appreciated that this is not limiting.

The instance of the client application or software 105 on each computer equipment is operatively coupled to at least one of the blockchain nodes 126 of the network 132. This enables the wallet function of the client 105 to send transactions 152 to the network 132. The client 105 is also able to contact blockchain nodes 126 in order to query the blockchain 150 for any transactions of which the respective party 103 is the recipient (or indeed inspect other parties' transactions in the blockchain 150, since in embodiments the blockchain 150 is a public facility which provides trust in transactions in part through its public visibility). The wallet function on each computer equipment is configured to formulate and send transactions 152 according to a transaction protocol. As set out above, each blockchain node 126 runs software configured to validate transactions 152 according to the blockchain node protocol, and to forward transactions 152 in order to propagate them throughout the blockchain network 132. The transaction protocol and the node protocol correspond to one another, and a given transaction protocol goes with a given node protocol, together implementing a given transaction model. The same transaction protocol is used for all transactions 152 in the blockchain 150. The same node protocol is used by all the nodes 126 in the network 132.

When a given party 103, say Alice, wishes to send a new transaction 152j to be included in the blockchain 150, then she formulates the new transaction in accordance with the relevant transaction protocol (using the wallet function in her client application 105). She then sends the transaction 152 from the client application 105 to one or more blockchain nodes 126 to which she is connected. E.g. this could be the blockchain node 126 that is best connected to Alice's computer. When any given blockchain node 126 receives a new transaction 152j, it handles it in accordance with the blockchain node protocol and its respective role. This comprises first checking whether the newly received transaction 152j meets a certain condition for being "valid", examples of which will be discussed in more detail shortly. In some transaction protocols, the condition for validation may be configurable on a per-transaction basis by scripts included in the transactions 152. Alternatively the condition could simply be a built-in feature of the node protocol, or be defined by a combination of the script and the node protocol.

On condition that the newly received transaction 152j passes the test for being deemed valid (i.e. on condition that it is "validated"), any blockchain node 126 that receives the transaction 152j will add the new validated transaction 152 to the ordered set of transactions 154 maintained at that blockchain node 126. Further, any blockchain node 126 that receives the transaction 152j will propagate the validated transaction 152 onward to one or more other blockchain nodes 126 in the network 132. Since each blockchain node 126 applies the same protocol, then assuming the transaction 152j is valid, this means it will soon be propagated throughout the whole network 132.

Once admitted to the ordered set of transactions 154 maintained at a given blockchain node 126, that blockchain node 126 will start competing to solve the proof-of-work puzzle on the latest version of their respective ordered set of transactions 154 including the new transaction 152 (recall that other blockchain nodes 126 may be trying to solve the puzzle based on a different ordered set of transactions 154, but whoever gets there first will define the ordered set of transactions that are included in the latest block 151. Eventually a blockchain node 126 will solve the puzzle for a part of the ordered set 154 which includes Alice's transaction 152j). Once the proof-of-work has been done for the ordered set 154 including the new transaction 152j, it immutably becomes part of one of the blocks 151 in the blockchain 150. Each transaction 152 comprises a pointer back to an earlier transaction, so the order of the transactions is also immutably recorded.

Different blockchain nodes 126 may receive different instances of a given transaction first and therefore have conflicting views of which instance is 'valid' before one instance is published in a new block 151, at which point all blockchain nodes 126 agree that the published instance is the only valid instance. If a blockchain node 126 accepts one instance as valid, and then discovers that a second instance has been recorded in the blockchain 150 then that blockchain node 126 must accept this and will discard (i.e. treat as invalid) the instance which it had initially accepted (i.e. the one that has not been published in a block 151).

An alternative type of transaction protocol operated by some blockchain networks may be referred to as an "account-based" protocol, as part of an account-based transaction model. In the account-based case, each transaction does not define the amount to be transferred by referring back to the UTXO of a preceding transaction in a sequence of past transactions, but rather by reference to an absolute account balance. The current state of all accounts is stored, by the nodes of that network, separate to the blockchain and is updated constantly. In such a system, transactions are ordered using a running transaction tally of the account (also called the "position"). This value is signed by the sender as part of their cryptographic signature and is hashed as part of the transaction reference calculation. In addition, an optional data field may also be signed the transaction. This data field may point back to a previous transaction, for example if the previous transaction ID is included in the data field.

Transactions recorded in the blockchain 112 model a transfer of value which is either spent or unspent and protected by a locking script. A transaction spends value through its inputs and pays value forward via its outputs. The value input to a transaction must equal or exceed the value output by a previous transaction, with any surplus input collected as a transaction fee. A transaction is invalid if: the solutions presented to locking scripts, i.e. unlocking scripts, are incorrect; if it outputs more value than is taken as input; if it spends output that has already been spent or it attempts to spend value which does not exist at all.

Both locking scripts and unlocking scripts are expressed in machine-readable scripting language allowing for a large variety of scripted spending conditions, including scripts which can embed arbitrary data (in the form of a provably unspendable output) as a data carrier output.

The payment processing resource 106 in FIG. 1a is configured to interact with the blockchain 112. The payment processing resource is configured to retrieve blockchain transactions and to provide unlocking scripts to spend previously unspent outputs (UTXOs) from blockchain transactions. The unspent transactions may be stored in a distributed hash table (DHT). The payment processing resource 106 is configured to generate blockchain transactions using previously unspent outputs and to provide its own funds as input to those transactions. The payment processing resource 106 is configured to check that the outputs being spent by the transaction are not already spent outputs, i.e. that they are unspent outputs and are not double spends, by checking the DHT or a temporary/secondary mempool for the presence of the outputs. The payment processing resource 106 is then further configured to send the blockchain transactions to the blockchain 112 and to receive a notification from the blockchain 112 when the transaction has been received. On receiving a notification that the transaction has been received by the blockchain 112, the payment processing resource 106 is configured to generate an identifier for the transaction. The identifier may be alphanumeric. The payment processing resource 106 is configured to add provably unspendable outputs to the blockchain transactions it generates and use them to append data carriers comprising a hash of data provided by the payment processing resource 106.

On generation of an identifier by the payment processing resource 106, the payment processing resource 106 is configured to request that the data is recorded in an event stream (as will be further described below).

The payment processing resource 106 is configured to store information relating to accounts used by users of the payment processing resource 106. The payment processing resource 106 may utilise a database management system (DBMS) 140 to create, delete and manage information relating to these accounts. The DBMS 140 may be located locally or remotely relative to the payment processing resource 106 and the payment processing resource 106 may access the DBMS 140 using any suitable telecommunications media.

The payment processing resource 106 in FIG. 1*a* is configured to interact with a key storage module 122 and a payment data store 124. The key storage module 122 is configured to store cryptographic keys corresponding to the accounts of parties who use the payment processing resource 106 to enable transactions to take place. The key storage module 122 may utilise any suitable storage and will utilise a database management system (DBMS) to initialise, store and retrieve data from records inside a database of the parties who store cryptographic keys in the key storage module 122. The payment data store 124 is configured to store data related to any payments which are implemented using the payment processing resource 106.

A user of either of the first computing device 102 or the second computing device 126 may establish a account with the payment processing resource 106. The establishment of such an account is now described with reference to FIG. 2.

Alice initialises the set up process by providing input which requests access to the payment processing resource 106 in a step S200. The first computing device 102 accesses the API 108 in a step S202 and provides authentication data to the API 108 to enable the interaction with the payment processing resource 106 to take place. Authentication data may comprise any data which can uniquely identify the user of the first computing device 102. Examples would be a password, a combination of name and data of birth or any other data items which can uniquely identify a user. On approval of the authentication data, the payment processing resource 106 transmits a request for information needed to set up the account on the payment processing resource 106 in a step S204.

The information needed for the payment processing resource 106 to set up the account is the identity of the asset registry that acts as a bookkeeping authority for managing the account, i.e. a bank providing the bank account e.g. HSBC, information identifying the user, e.g. a cryptographic public key for the user, data corresponding to a signed version of the terms and conditions of the issuer, an identification of the currency the user wishes to use, e.g. GBP (Pounds Sterling), a cryptographic public key for the issuer, and, a minimum balance value setting a minimum value for the account. Each asset registry is associated with at least one issuer of the corresponding asset that is associated with all accounts managed by the asset registry. For example, a bank is associated with issuers of GBP and EUR. A bank may also be associated with issuers of other assets such as gold and other precious metal. An example of an issuer of gold may the Royal Mint in the United Kingdom. The information is stored in a record in the DBMS 140 by the payment processing resource 106.

Alice then provides the required information. The information is transmitted to the payment processing resource 106 via the API 108 in a step S206. On receiving the details, the payment processing resource 106 generates a record in an asset registry database in a step S208 and populates the record with the details provided in a step S210.

The payment processing resource 106 then initialises, in a step S212, an event stream 110*a* in accordance with UK Patent Application No. 2102314.8 corresponding to the account of Alice in the event that one has not already been initialised. Alternatively or additionally, the payment processing resource 106 may already have stored an event stream 110*a* for Alice The payment processing resource 106 then transmits a confirmation message to first computing device 102, in a step S214, to confirm a account has been established for Alice. The steps S200 to S214 would also be used by to Bob to establish an account on the payment processing resource 106 (associated with a bank such as HSBC). Event stream 110*b* would also be initialised corresponding to Bob's account.

Event streams are blockchain-based append-only logs. A user of the payment processing resource 106, such as Alice or Bob, can create, append to and close an event stream which corresponds to their account. These will be described later.

Alternatively, Alice or Bob may provide details of an account associated with an asset registry they already use and avoid the steps S200 to S214 provided they have provided all of the necessary information.

Preparing Payment Data for Recordal

We now describe a plurality of example scenarios where a transfer of assets is enabled by the payment processing resource 106. These examples are intended to be illustrative and non-limiting in that features of each example can be combined with features from other examples.

Figure 3A:
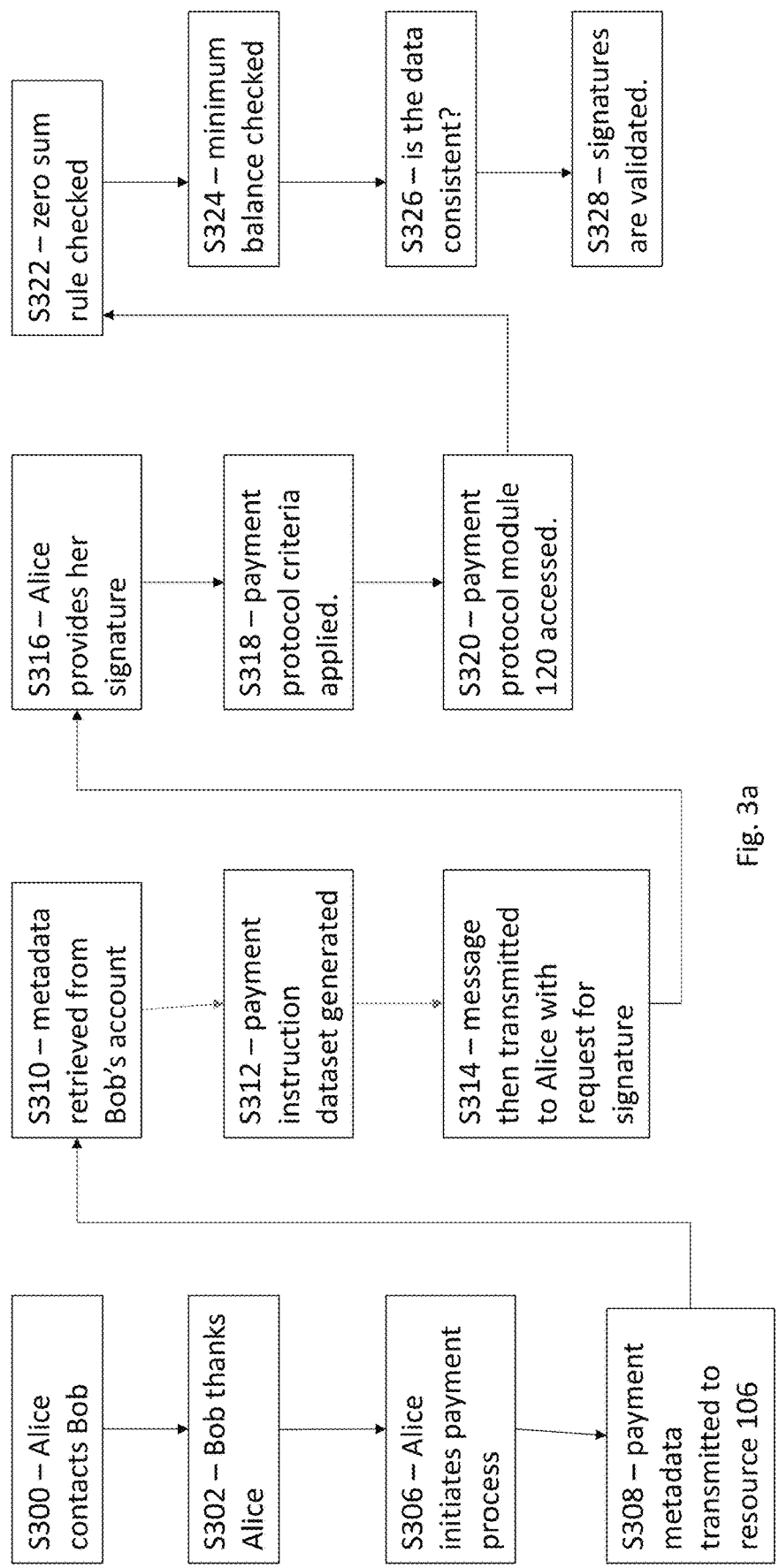
FIGS. 3a and 3b illustrate a flow chart detailing a payment from a sender to a recipient in accordance with the embodiment.
Figure 3B:
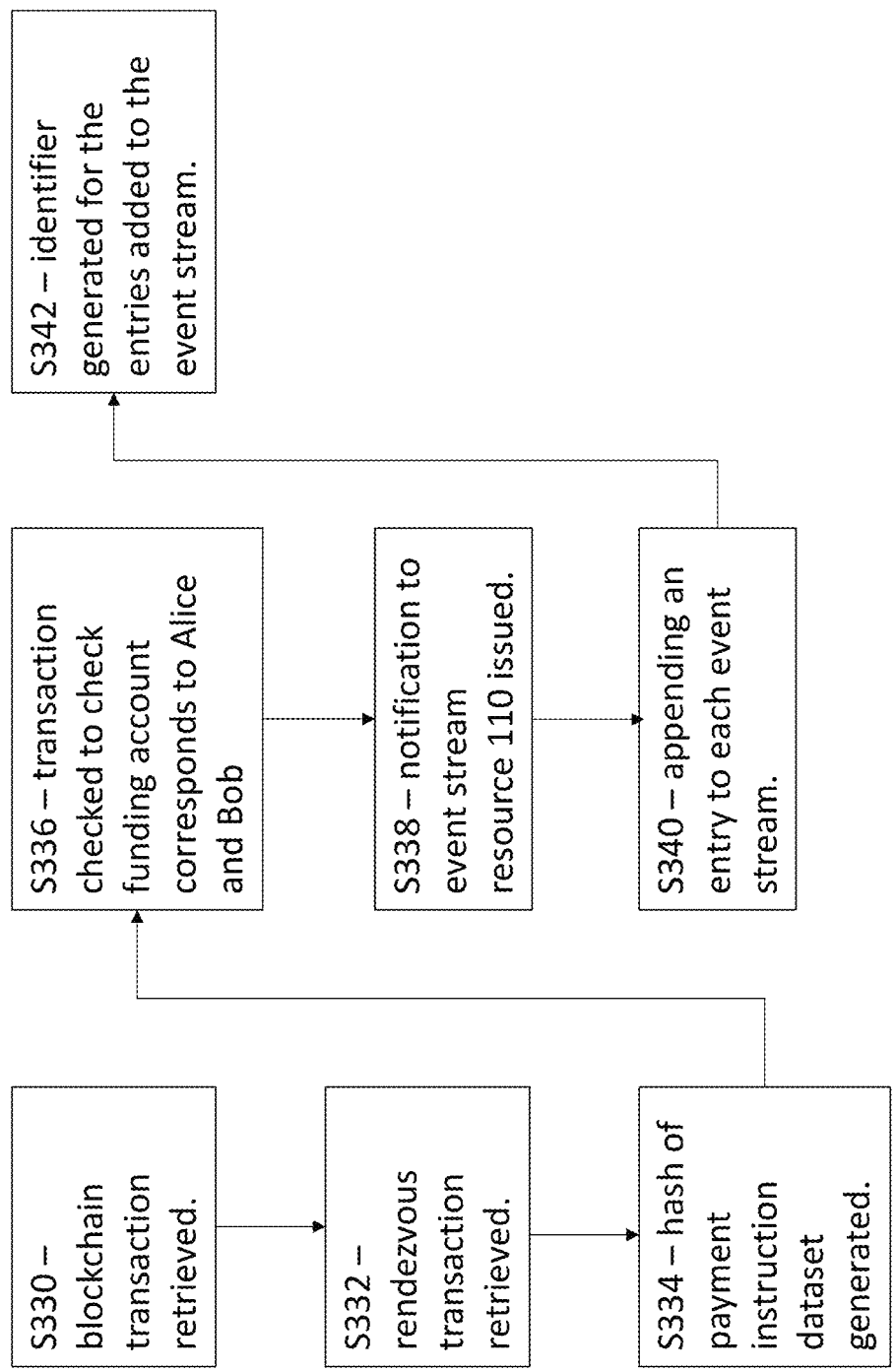

We now describe an example scenario where Alice sends 5 GBP to Bob using the payment processing resource 106 with reference to FIG. 3*a* and FIG. 3*b*. In this example, the asset being transferred is cash and the asset registry is a bank.

In a step S300, Alice contacts Bob to inform him of her wish to send him 5 GBP for his upcoming birthday. In step S302, Bob messages Alice using any suitable medium to thank her for her generosity.

Alice then uses first computing device 102 to indicate her desire to pay 5 GBP to the payment processing resource 106. The first computing device 102 accesses API 108 to initiate the payment process using the account created by Alice in accordance with steps S200 to S214. This is step S306. The call from device 102 to API 108 indicates the amount that Alice wishes to pay to Bob. The call from device 102 also indicates the account from which Alice wishes to pay and the currency in which Alice wishes to pay and whom she wishes to pay, i.e. Bob. The amount Alice wishes to pay to Bob, the identification of Bob, the identification of the account from which Alice wishes to pay (i.e. GBP) form a set of payment metadata which is transmitted to the payment processing resource 106 in a step S308.

The payment processing resource 106, on receiving the payment metadata from Alice, then retrieves metadata from Bob's account based on the metadata Alice has provided in step S308. This is step S310. The payment processing resource 106 retrieves from Bob's account the currency which Bob's account relates to, i.e. pounds sterling (GBP) and the bank.

The payment processing resource 106, in step S312, then generates a payment instruction dataset using the payment metadata received from Alice and the information retrieved from Bob's account.

In this example, the provider of Bob's bank account is "hsbc.com", the currency is identified as GBP, the value of the payment (i.e. the amount being received by Bob) is 5

GBP, the identification of the account is given by <Bob: HSBC>; the user is identified as Bob by the "kyc" value, and the actor is identified as the beneficiary of the payment, i.e. the individual receiving the payment. This forms part of the payment instruction dataset. The payment instruction dataset may optionally also include a version of the terms and conditions which have been signed by Bob using the signature <Bob_sig>

Another part of the payment instruction dataset is formed by Alice's details. That is, the provider of the account is "hsbc.com", the currency is identified as GBP, the value of the payment being transferred to Bob is 5 GBP (i.e. a debit of 5 GBP from Alice to be paid to Bob and so is expressed as −5 in the payment instruction dataset), the identification of the account is given by <Alice:HSBC>, the user is identified as Alice by the "kyc" value. The payment instruction dataset may also contain the terms and conditions signed by Alice which may be contained in a document which may be accessed from a provided by a uniform resource locator (URL). The payment instruction dataset also identifies the actor as the originator of the payment, i.e. the individual making the payment.

A message is then transmitted to first computing device 102 with a request for Alice's signature on the payment instruction dataset in a step S314. Alice then provides her cryptographic signature in a step S316 to approve the payment of 5 GBP to Bob. Alice's signature is then applied by the payment processing model 132 to the payment instruction dataset. That is to say, Alice signs the payment instruction dataset with her cryptographic signature. In short, Alice's account is debited and Bob's account is being credited. Therefore, Alice's signature is needed. Bob's signature may only be needed if he provided a t&c link (i.e. a URL to a document of terms and conditions he had signed) and a hash of the document containing the terms and conditions. This means that, in the event Alice is buying something from Bob in exchange for the transferred funds, Bob can be provably shown to have offered terms and conditions in return for the payment.

Only one signatures is needed in this example as the banks are identical and the amounts are balanced. Two signatures may be needed if Bob provided a t&c link as set out above.

The payment processing resource 306 then applies a payment protocol criteria to the payment instruction dataset in a step S318. The payment processing resource 306 accesses a payment protocol module 120 in a step S320.

The payment protocol module 120 first checks that the payment instruction dataset obeys a zero-sum rule in that the amounts are consistent, i.e. the amount being taken from Alice's account equals the amount being paid to Bob's account. This is step S322. The zero-sum rule is obeyed because 5 GBP is being taken from Alice's account and 5 GBP is being paid to Bob's account, i.e. the amount is identical, and the banks are identical. That is to say, because −5 GBP is being added to Alice's account and +5 GBP is being added to Bob's account, the respective amounts sum to zero. As the banks are identical, this step is satisfied and the dataset obeys a zero-sum rule.

The payment protocol module 120 then checks that the amount being transferred from Alice to Bob does not make Alice's balance fall below some minimum value. This is step S324. That is to say, does Alice spend too much? If Alice is spending too much, i.e. if her balance (minus the 5 GBP) does fall below a minimum value, then the payment protocol module 120 will issue an error message to Alice to let her know she cannot spend the money she wishes to spend, i.e. she does not have the funds to pay Bob 5 GBP. Indeed, it is possible for the minimum value to be negative if a credit facility is being used. The payment protocol module 120 will return to step S320 until it is given the instruction to begin again, i.e. when Alice has deposited more funds into her bank account or her minimum balance has been altered.

The payment protocol module 120 then checks whether the data relating to the payment is consistent between the two parties to the transaction by checking the fields across the data corresponding to the identification of the asset. This is step S326. The data in this example is consistent as the zero-sum rule is satisfied, the banks are the same, i.e "hsbc.com" and the currency is the same.

That is to say, the bank and the asset identification balance. As will be seen in further examples below, when the bank and asset identification do not balance, further metadata needs to be generated to provide the required balance.

Another way of illustrating this may utilise the template (XXX_BBBB:AAAA) to denote a bank and asset identification, where XXX is the operator of the account, BBBB is the bank identification and AAAA is the asset identification. We can use this template to illustrate that 5 GBP is paid from Alice_HSBC:GBP to Bob_HSBC:GBP where it can be seen that the bank and the asset identification are balanced.

The payment processing module 120 moves to step S328 where the cryptographic signatures of Alice and Bob are validated. The payment processing module 120 validates the cryptographic signatures of Alice and Bob by generating a hash of each signature and comparing the hash to one stored in the record generated in steps S200 to S214. This also confirms the identity of Alice and Bob. Alternatively or additionally, standard PKI techniques based on cryptographic private/public key pairs may also be used to validate each signature. These techniques can also be used to verify the identity of the client.

The satisfaction of steps S322, S324, S326 and S328 mean the criteria stipulated by the payment protocol have been satisfied and so the payment processing resource 106 allows the payment from Alice to Bob of 5 GBP to be made in accordance with the payment instruction dataset.

The payment processing resource 106 then retrieves a blockchain transaction from the blockchain 112 for each of Alice and Bob in a step S330. This is described with reference to the illustrative schematic in FIG. 3c.

The blockchain transaction 402 for Alice comprises a dust output (Tx0, Alice) and the blockchain transaction 404 for Bob comprises a dust output (Tx0, Bob)

Generation of a Rendezvous Transaction

Figure 3C:
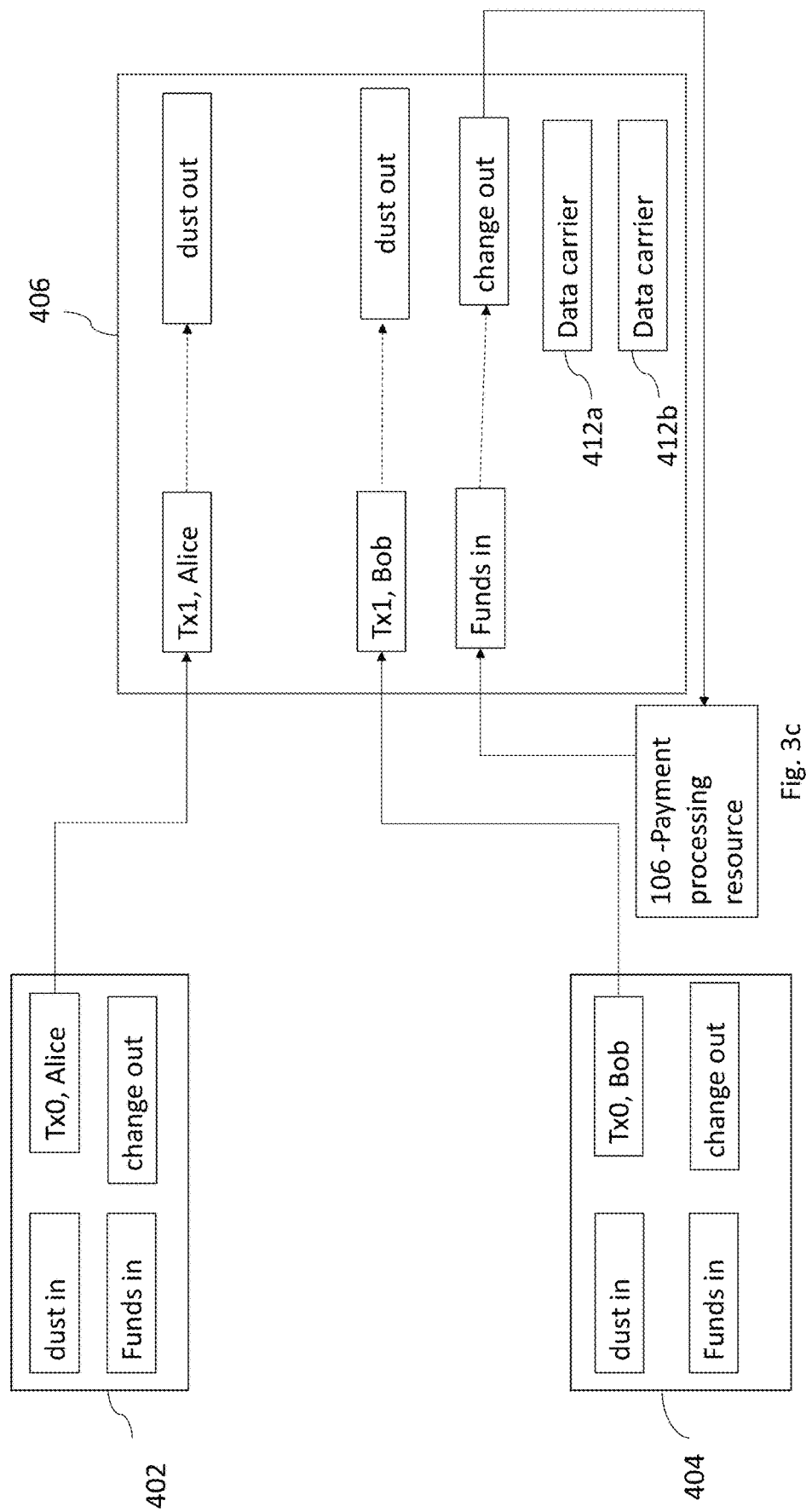
FIG. 3c illustrates a rendezvous transaction in accordance with the embodiment.

The payment processing resource 106 then generates a new rendezvous blockchain transaction 406 comprising a dust input for each of Alice and Bob which spends the respective dust outputs from the blockchain transactions retrieved in step S330. The dust outputs may be retrieved from a dust chain corresponding to event streams associated with Alice and Bob. This is also illustrated in FIG. 3c. The chain of transactions between 402 and 404 into 406 can be described as a chain of dust transactions. A dust input/output is an input/output for an amount of cryptocurrency which is denoted to be "dust" by the field of cryptocurrency. The "dust" in the context of blockchain transaction for the present disclosure is understood to be a spendable transaction for a digital asset or cryptocurrency that has an output of low or minuscule value, i.e. the value may be much less that fees for mining the output in the blockchain.

Alternatively, the payment processing resource 106 may generate a new dust transaction using a combination of dust which does not form part of a pre-existing event stream and a hierarchical deterministic (HD) key chain as described in UK patent application no. 2102217.3. In other words, a dust transaction is generated which uses dust as an input and comprises inputs corresponding to each of Alice and Bob, wherein that dust has not been previously used in an event stream. A party in possession of the HD key chain may use one of the sub-keys and the dust to generate the first transaction in the new event stream. In short, a new event stream may be initiated based on dust which can be retrieved from an existing transaction on blockchain 112 and used as the base for the start of the new event stream. That is to say, the dust may be used to generate the transaction (in order to start the new event stream) and then returned to the platform before being used in the initiation of another event stream.

Figure 3D:
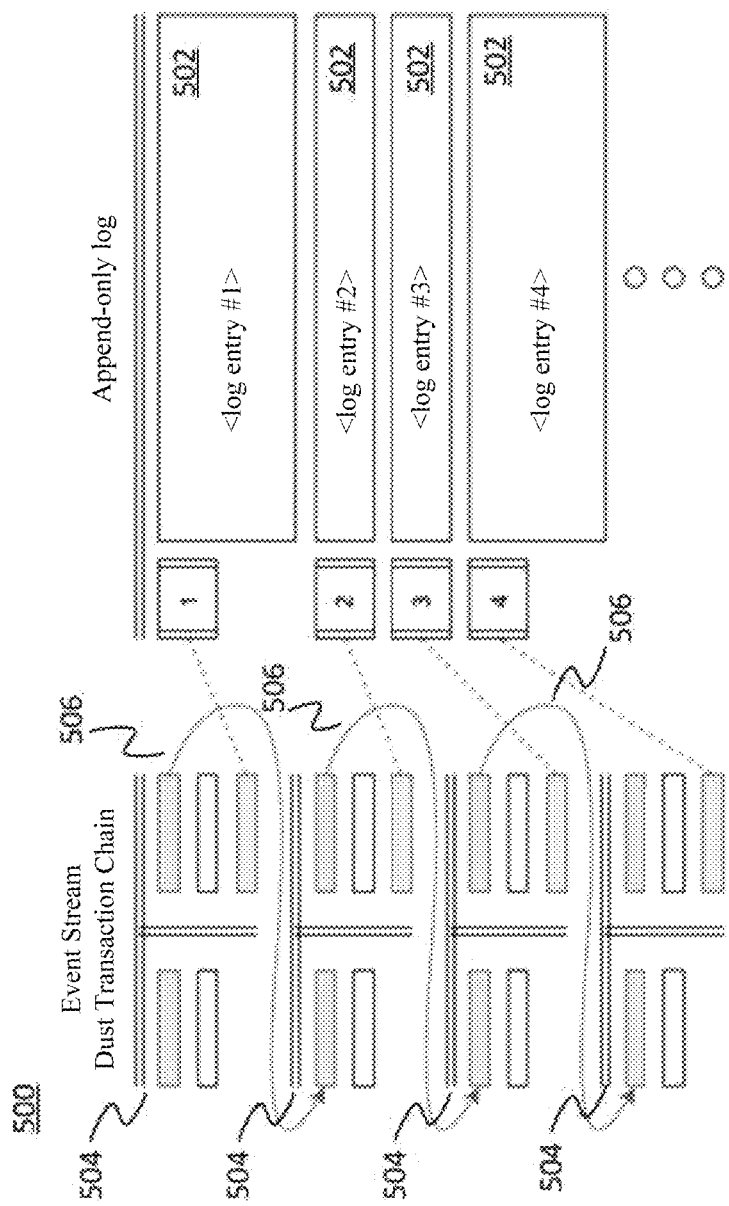
FIG. 3d illustrates the relationship between a chain of dust transactions and an event stream.

The relationship between chains of dust transactions and an event stream is further now elucidated with reference to FIG. 3d.

Figure 4A:
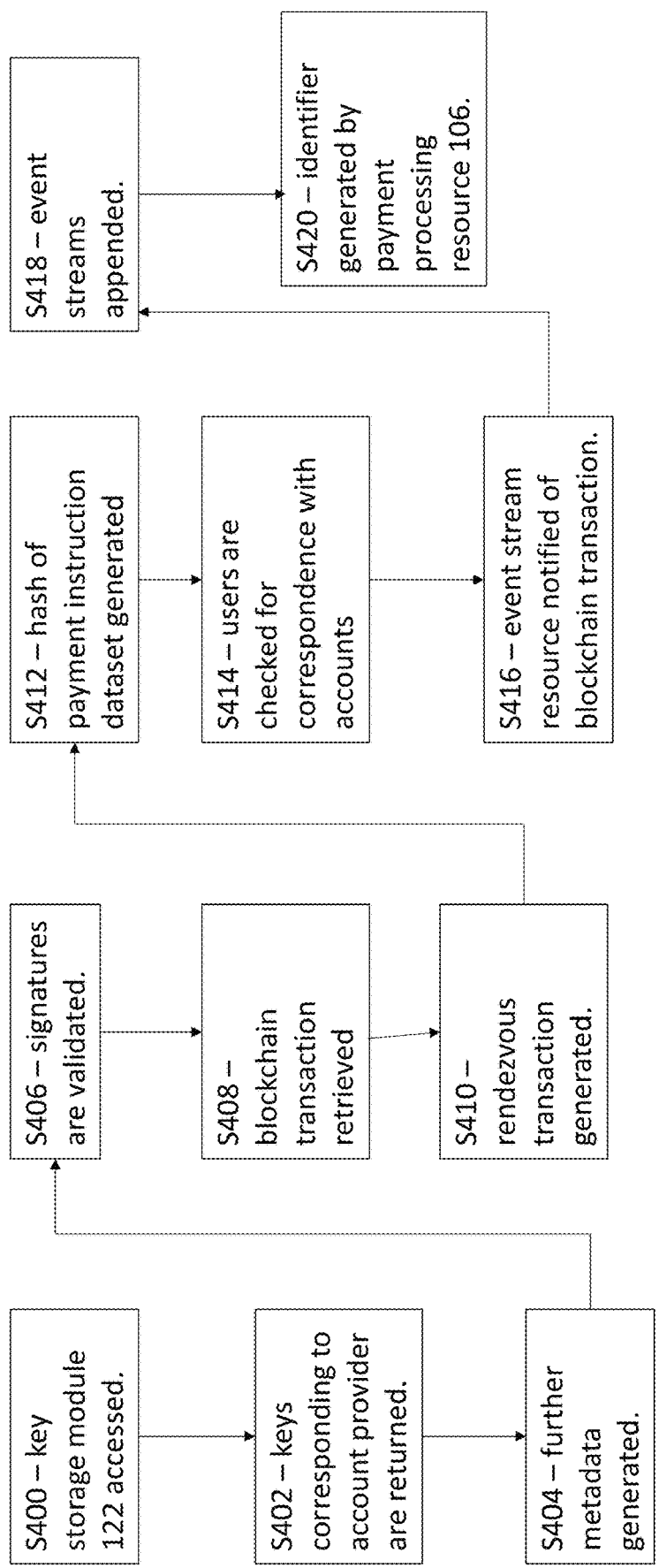
FIG. 4a illustrates a flow chart detailing a payment from a sender to a recipient in accordance with the embodiment.

FIG. 3d relates to a first aspect of the present disclosure and illustrates the basic data structure and paradigm of an ordered, append-only data storage system. This can also be described as a data logging system. The particular system shown in FIG. 3d is an Event Stream system for logging events. By way of example, the Event Stream is used throughout for illustrative purposes, however a skilled person will appreciate that the proposed systems and aspects described herein may be used with data items generally and with ordered, append-only data item logging or storage systems. Consistent with FIGS. 4 and 6, data item refers to a hash of actual data. The use of a hash instead of the data itself advantageously provides a proof of existence for the data without requiring the data (which may large, even too large for a transaction) to be stored on a transaction. This also preserves the privacy of the data as the data will be indiscernible from the hash even if the hash is published on chain. The data described here is the payment instruction data related to the payment which is being recorded by the payment processing resource 106.

Each event 502 in the append-only log is mapped to a blockchain transaction 504, and the sequence of blockchain transactions are ordered and linked 506 using a 'chain of dust'. The data associated with each event is stored in a payload (described below) as a part of each transaction. The data payload (i.e. the hash of the payment instruction metadata) is held in an un-spendable OP_RETURN output of the transaction—an example of such a transaction is rendezvous transaction 406 as described above. This is a Script opcode which can be used to write arbitrary data on blockchain and also to mark a transaction output as invalid. As another example, OP_RETURN is an opcode of the Script language for creating an un-spendable output of a transaction that can store data such as metadata within the transaction, and thereby record the metadata immutably on the blockchain.

A chain of dust is an unbroken chain of cryptocurrency inputs and outputs, which are used here to impose a spending dependency of each blockchain transaction in the sequence on its immediate predecessor.

The use of dust outputs in the transactions is advantageous and key for maintaining an immutable sequential record of all transactions as they occur for an ordered, append-only data storage system, such as an Event Stream. This is because, although by posting transactions to the blockchain all blockchain transactions would be time-stamped and remain in a particular order once they are confirmed on or added to the blockchain, this does not guarantee preservation of their sequential order. This is because transactions might be mined into blocks at different times and/or the transactions are in a different order even within the same block. The use of dust outputs that are spent by the first input of the next transaction in the sequence advantageously ensures that the order of the transaction is chronologically tracked and a tamper-proof record of both the events themselves and the sequential ordering of the events is created. This is because once mined into a block, the payment of dust from a previous transaction to a next one in the sequence ensures that, in alignment with Bitcoin protocol rules, the sequence of embedded data carrier elements, called payloads and discussed below, cannot be reordered, and no insertions or deletions may occur, which could change it without it being immediately obvious that the event stream has been compromised. In some embodiments, a double spend prevention mechanism inherent to the Bitcoin protocol ensures that the movement of cryptocurrency (e.g. dust) between different transaction inputs and outputs remains in chronological order. The chaining of dust transactions takes advantage of the topological ordering to provide inter and intra block transaction (and therefore associated events and data) order preservation. Thus, this improves the integrity of ordered, append only data item storage.

In this manner, the blockchain transactions 504 form a directed graph of transactions. It should be noted that the direction of the graph can be considered as one-way, directed from the previous transaction in the sequence to the next, as indicated by the edges 506. While the arrows on edges 506 in FIG. 3d indicate a transaction pointing to the next, the spending relationship in a Bitcoin transaction is actually from one transaction to the preceding. This graph is created by the spending relationship between transactions. These spending relationships can be considered as a type of reference. Further details about how to append an event to an event stream can be found in UK Patent Application No. 2102314.8 and particularly, but not exclusively, where it refers to "Ordered, Append-only data Storage", "Event Stream and the Chain of Dust" and "Backward Referencing in the Chain of Dust"

A rendezvous blockchain transaction, such as transaction 406 illustrated in FIG. 3c, is a blockchain transaction for synchronising a plurality of event streams, each associated with a given entity/user mentioned above. This is achieved by by spending multiple dust outputs as corresponding inputs. In this example this allows a chain of dust (i.e. a dust input/output pair) corresponding to each of Alice, Bob and HSBC to pass through a single transaction. Dust chain input/output pairs must have corresponding input/output indices in the transaction. In this instance dust chain input/output pairs are used, as you will read below, to enable payments to be recorded in all event streams associated with the transaction.

The dust input which spends the dust output for Alice is denoted as Tx1, Alice and the dust input which spends the dust output for Bob is denoted as Tx1, Bob. The new rendezvous blockchain 406 transaction is generated in step S332.

The funds into the rendezvous blockchain transaction 406 are added by the payment processing resource 106 and will be paid back to the payment processing resource 106. This may be minus any miners fees following validation of the rendezvous blockchain transaction 406 if it is sent to the blockchain 112 for validation.

The rendezvous blockchain transaction 406 comprises further dust outputs which respectively spend Tx1, Alice and Tx1, Bob. As it is a rendezvous transaction, the indexes of the input/output pairs corresponding respectively to Alice and Bob are identical in that, for example, the input index of Tx1, Alice may be assigned as number 1 and the output index of the corresponding dust output is assigned as output index number 1.

The payment processing resource 106 also adds a provably unspendable output to the blockchain transaction 406 for each of Alice and Bob in the form of a data carriers 412a and 412b.

Each of the data carriers may hold a distinct dataDigest and/or a distinct streamDigest, wherein the streamDigest may also be salted.

The data payload held inside the respective data carrier (i.e. the hash of the payment instruction metadata) is held in an un-spendable OP_RETURN output of the transaction which means the data payload can then be stored in the blockchain as an unspendable output. This means the data payload held inside the data carrier (i.e. the hash of the payment instruction metadata) is held in an un-spendable OP_RETURN output of the transaction which means the data payload can then be stored in the blockchain as an unspendable output.

The data inside the data carrier 412 comprises a hash of the payment instruction dataset generated by the payment processing resource in steps S300 to S328. This is generated in step S334. The provably unspendable output enables the rendezvous transaction 406 to carry the hash of the payment instruction dataset in the transaction and enables the hash to be stored on the blockchain. This means that the payment instruction dataset and, thus, a record of the payment is stored on the blockchain. This means that the record of the payment benefits from the immutability of the blockchain.

The blockchain transaction 406 may then be checked to see if the user's corresponding to the transaction is correct and correspond to the users, i.e. Alice and Bob. This is step S336.

The payment processing resource 106 issues a notification to the event stream resource 110 confirming the blockchain transaction 406 in a step S338 can be used as the basis for appending data to the event streams, i.e. the event streams in respect of Alice and Bob.

An event stream is a blockchain-supported append-only log. In this example, Alice and Bob, each have their own event stream but, if they do not, an event stream may be initialised. That is to say, Alice has an event stream (E-Alice) and Bob has an event stream (E-Bob). Entries in the event stream may be denoted as ESn where n may be a non-zero positive integer or a non-negative integer.

As illustrated in FIG. 3d, event streams can be illustrated as a series of entries where any entry in the stream may be referred to by a monotonically incrementing sequence number, i.e. the first entry may be referred to as ES1, the second entry may be referred to as ES2.

The payment processing resource 106 only appends to a respective event stream if Alice and Bob are authorised to access or append the event stream. The authorisation may be checked, for example, by comparing the signatures with stored signatures at the payment processing resource 106. By appending the payment data to the event stream, the payment can be recorded and benefit from being recorded on an immutable log which is associated with the blockchain 112. In short, the event stream is used to track the order of transactions from the accounts associated with Alice and Bob. That is to say, the entries in the event stream are an immutable log associated with the blockchain 112. Event streams as described above ensure:

Individual entries in the event stream have not been modified since they were written;

No entries have been inserted between previously contiguous entries;

No entries have been removed;

No entries have been re-ordered;

Unauthorised parties may not append events to a stream.

Figure 3E:
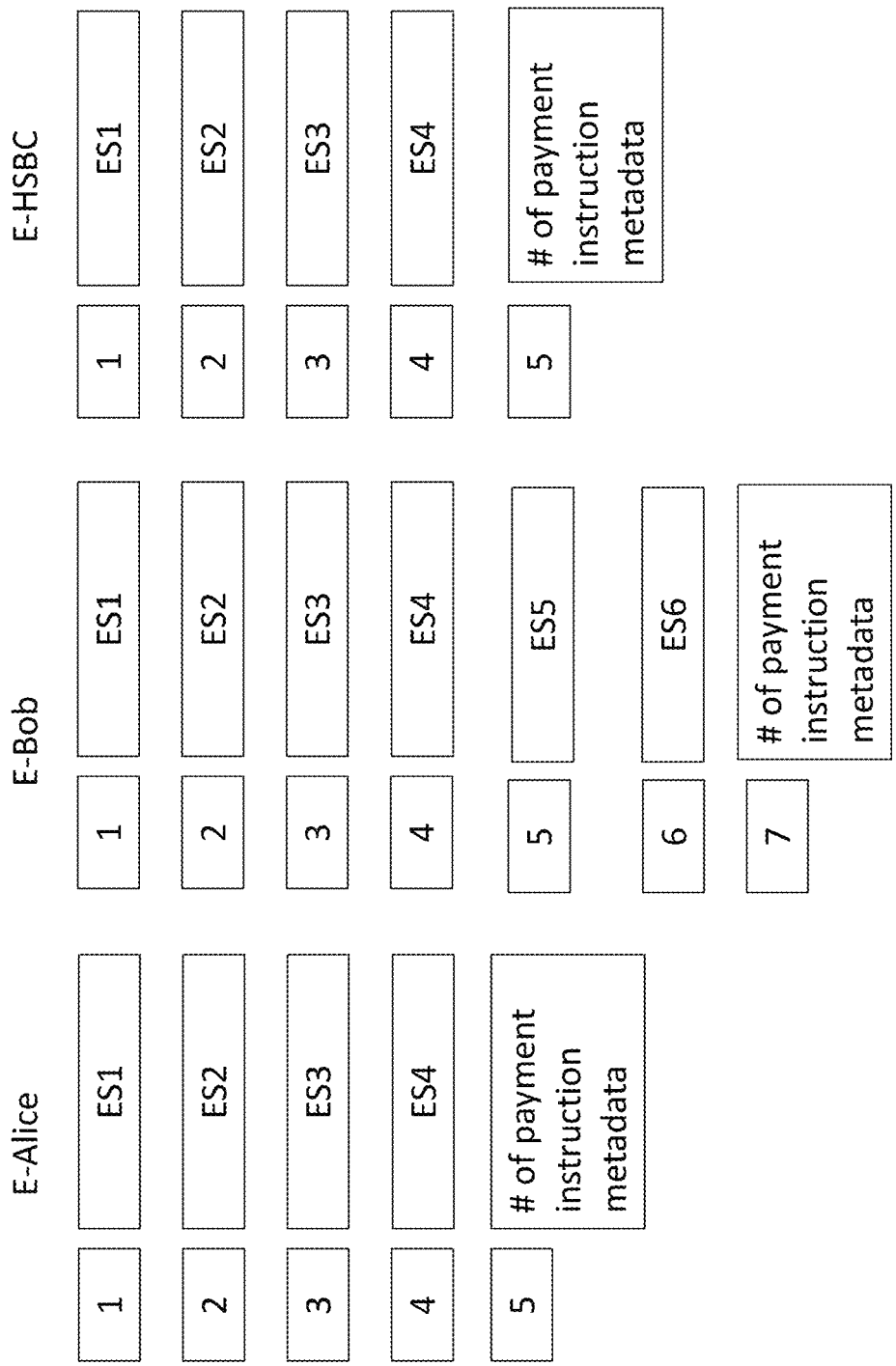
FIG. 3e illustrates a plurality of event streams corresponding to the parties to a transaction.

The payment processing resource 106 uses the rendezvous transaction 406 to synchronise the payment with the event streams E-Alice and E-Bob by appending an entry to each of those event streams containing the hash of the payment instruction metadata contained in the data carrier in blockchain transaction 406. This is step S340. This is illustrated schematically in FIG. 3e.

The payment processing resource 106 then generates an identifier for the entry added to each of the event streams. This is step S342. The identifier may be alphanumeric or it may be a number which is generated based on the hash of the payment instruction metadata. For example, if the hash of the payment instruction metadata is generated by an SHA256 cipher, the identifier may be generated by applying a further SHA256 cipher to the hash of the payment instruction metadata. That is to say, the identifier may be a hash of the hash of the payment instruction metadata.

The payment processing resource 106 then stores the identifier alongside a copy of the payment instruction metadata in the payment data store 124. This enables verification of the payment between Alice and Bob on request.

We now describe a further example scenario where Alice again pays Bob a sum of 5 GBP but where Bob's account is provided by Revolut, rather than HSBC. This is described with reference to FIG. 4a and FIG. 4b. This example is identical to the example described with reference to FIGS. 3a to 3e up to step S326. Therefore, in the interests of brevity, we will begin our description at the stage described with reference to step S326.

In other words, there needs to be a balance in the bank for step S326 to provide a positive outcome and for the transaction to proceed. That is to say, metadata needs created which causes both the bank and the asset identification to balance.

That is to say, on checking by the payment protocol module 120 whether the data relating to the payment is consistent (in step S326) between the two parties to the transaction by checking the fields across the data corresponding to the parties. It is found that the providers of the accounts are distinct, i.e the provider of Alice's account is "hsbc.com" and the provider of Bob's account is "Revolut" although the currency is the same and the amount's complement each other, i.e. Alice incurs a debit of −5 GBP and Bob incurs a credit of 5 GBP.

Another way of illustrating this may utilise the template (XXX_BBBB:AAAA) to denote a bank and asset identification, where XXX is the operator of the account, BBBB is the bank identification and AAAA is the asset identification. In this instance, an attempt to transfer 5 GBP from Alice_HSBC:GBP to Bob_REVOLUT:GBP could not be completed.

The payment protocol module 120 then halts the checking of the payment instruction dataset against the payment protocol criteria. The payment processing resource 106 then generates further metadata to be added to the payment instruction dataset.

Generation of Further Metadata for Two Different Banks

The payment processing resource 106 accesses the key storage module 122 with a request for cryptographic keys corresponding to "Revolut.com" and "HSBC". This is step S400.

The key storage module 122 stores a plurality of cryptographic keys. Each cryptographic key is stored in a record corresponding to a bank such as "Revolut.com" or "HSBC" and enables the payment processing resource 106 to generate its own payment instruction data in respect of payments into and from accounts managed by these banks. This is particularly advantageous when a payment is being made between accounts with distinct banks as it means a payment can be securely enabled by the payment processing resource 106 even if the banks that the parties select for their accounts are distinct.

When the key storage module 122 is accessed, it receives input identifying the banks corresponding to the requested keys. The key storage module 122 returns the keys corresponding to the banks. In this example, keys are returned corresponding to banks "Revolut.com" and "HSBC". This is step S402.

The payment processing resource 106 then modifies the payment instruction dataset to include further metadata detailing two further payments. The metadata details that the first payment is for 5 GBP from Alice to HSBC and that is signed by the HSBC key retrieved from the key storage module 122 as that is a payment from Alice's HSBC account but it is not the payment Alice has already signed, i.e. the payment to Bob. The metadata further details that the second payment is from HSBC to Revolut (for 5 GBP, i.e. HSBC account is debited by 5 GBP) and that is signed by the Revolut.com key retrieved from the key storage module 122. The metadata then further details that a further payment is made from Revolut to Bob's Revolut account (i.e. Bob's balance is increased by 5 GBP but Revolut then have to debit that from HSBC's account with them). This is signed with Bob's key. This means that the inconsistency between the data identified in step S326 is resolved by the payment processing resource 106. This is step S404. That is to say, on determining the presence of the inconsistency, the inconsistency is resolved by the payment processing resource 106 to ensure the banks are consistent and the amounts are consistent.

Using the template described above, the modification of the payment instruction dataset include further metadata means that 5 GBP is paid from Alice_HSBC:GBP to HSBC_HSBC:GBP and then 5 GBP is paid from HSBC_HSBC:GBP to HSBC_REVOLUT:GBP and then a payment is made from HSBC_REVOLUT:GBP to Bob_REVOLUT:GBP which means that the bank identification and the asset identification are balanced and the transaction can be completed.

As step S326 initially returned a negative outcome, as the banks were not consistent, the payment protocol module 120 needs to begins again to assess the payment instruction dataset in view of the payment protocol. The payment instruction dataset already returned positive determinations regarding the satisfaction of the zero-sum rule and the spending limits of Alice, as set out with reference to steps S322 and S324. As the payment instruction dataset has now been modified to include the payments introduced by the payment processing resource 106 to resolve the lack of consistency between the banks and ensure the asset identification and bank are balanced, the payment processing module 120 moves to step S406 where the cryptographic signatures of Alice and Bob are validated.

The payment processing module 120 validates the cryptographic signatures of Alice and Bob by generating a hash of each signature and comparing the hash to one stored in the record generated in steps S200 to S214. This also confirms the identity of Alice and Bob. Alternatively or additionally, standard PKI techniques based on cryptographic private/public key pairs may also be used to validate each signature. These techniques can also be used to verify the identity of the client. The payment processing module 120 also validates the signatures of the two banks, i.e. HSBC and Revolut using similar techniques.

On completion of step S406, the payment processing resource 106 allows the payment from Alice to Bob of 5 GBP to be made in accordance with the payment instruction dataset. That is to say, the payment processing resource 106 resolves the lack of consistency in the payment instruction dataset by applying two further payments to resolve the lack of consistency and make the payment instruction dataset suitable for effecting the payment using the payment instruction dataset.

Rendezvous Transaction with Two Banks

The payment processing resource 106 then retrieves a blockchain transaction from the blockchain 112 for each of Alice and Bob in a step S408. This is described with reference to the illustrative schematic in FIG. 4*b*.

The blockchain transaction 602 for Alice comprises a dust output (Tx0, Alice) and the blockchain transaction 604 for Bob comprises a dust output (Tx0, Bob). The payment processing resource 106 also retrieves a blockchain transaction for the banks involved in the payment, i.e. HSBC and Revolut. The retrieved blockchain transaction 608 for HSBC comprises a dust output (Tx0, HSBC). The retrieved blockchain transaction 610 for Revolut comprises a dust output (Tx0, Revolut).

Figure 4B:
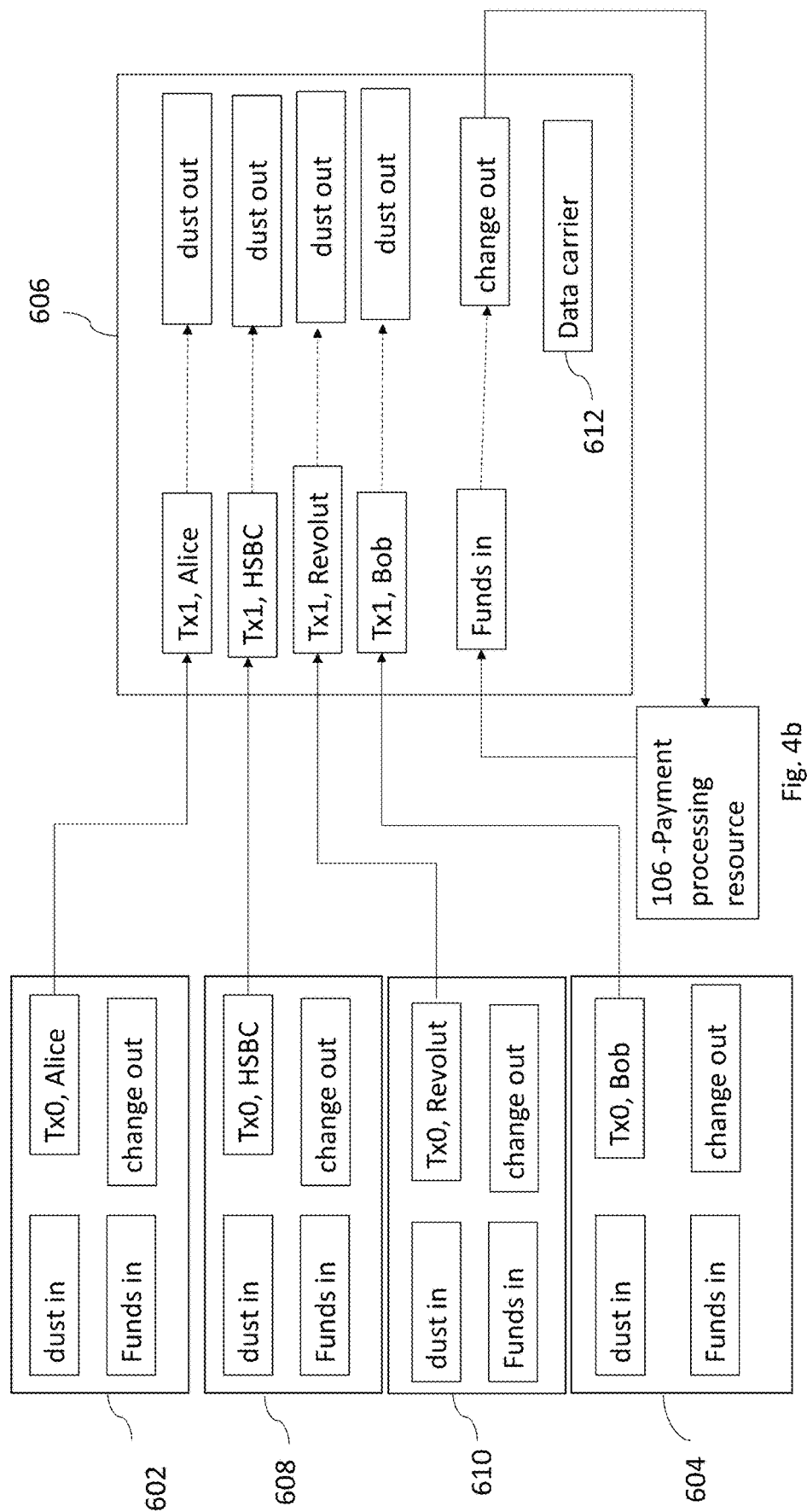
FIG. 4b illustrates a rendezvous transaction in accordance with the embodiment.

The payment processing resource 106 then generates a new rendezvous blockchain transaction 606 comprising a dust input for each of Alice and Bob which spends the respective dust outputs from the blockchain transactions retrieved in step S408. The dust outputs may be retrieved from a dust chain corresponding to event streams associated with Alice and Bob This is also illustrated in FIG. 4*b*. The rendezvous blockchain transaction 606 further comprises dust inputs for HSBC and Revolut retrieved from blockchain transactions 408 and 410 respectively.

Alternatively and as with the first example, the payment processing resource 106 may generate a new dust transaction using dust which does not form part of a pre-existing event stream and a hierarchical deterministic (HD) key chain.

The relationship between chains of dust transactions and an event stream has already been elucidated with reference to FIG. 3*d*.

Rendezvous blockchain transaction 606 is a blockchain transaction for synchronising the plurality of event streams corresponding to each of Alice, Bob, Revolut and HSBC The dust input which spends the dust output for Alice is denoted as (Tx1, Alice) and the dust input which spends the dust output for Bob is denoted as (Tx1, Bob). The new rendezvous blockchain 606 transaction is generated in step S410. The new rendezvous transaction also comprises dust inputs corresponding to HSBC, denoted respectively as (Tx1, HSBC), and Revolut, denoted respectively as (Tx1, Revolut).

The funds into the rendezvous blockchain transaction 606 are added by the payment processing resource 106 and will be paid back to the payment processing resource 106. This may be minus any miner's fees following validation of the rendezvous blockchain transaction 606 if it is sent to the blockchain 112 for validation.

The rendezvous blockchain transaction 606 comprises further dust outputs which respectively spend Tx1, Alice and Tx1, Bob. The rendezvous blockchain transaction 606 also comprises dust outputs corresponding to the dust nputs retrieved from blockchains in respect of HSBC and Revolut.com.

The payment processing resource 106 also adds a provably unspendable output to the blockchain transaction 606. This is used as a data carrier 612. Each of the data carriers may be identical and based on the same data and based on the same payment instruction dataset. The data carrier may hold some different data based on the streamState for the specific data stream the carrier is being appended to, the streamState is based on the previous streamState and/or index (or sequence number) and/or the individual salt which is used for the notaisation of that data carrier. Alternatively or additionally, further provably unspendable outputs may be added to correspond to all parties providing input to the blockchain transaction 606 to append data carriers for each of those parties. That is to say, each respective data carrier may contain data which is relevant to each respective party in that each respective data carrier may be different dependent on the respective party. For example, the difference may be that data carriers in respect of Alice contain data which is only relevant to Alice, i.e. her name and her account number and data carriers in respect of Bob may contain data which is only relevant to Bob, i.e. his name and his account number.

Like with the first example, the data payload held inside the data carrier (i.e. the hash of the payment instruction metadata) is held in an un-spendable OP_RETURN output of the transaction which means the data payload can then be stored in the blockchain as an unspendable output.

The data inside each of the data carriers 612 comprises a hash of the payment instruction dataset generated by the payment processing resource 106. This is generated in step S412. The provably unspendable output enables the rendezvous transaction 606 to carry the hash of the payment instruction dataset in the transaction and enables the hash to be stored on the blockchain. This means that the payment instruction dataset and, thus, a record of the payment is stored on the blockchain. This means that the record of the payment benefits from the immutability of the blockchain.

The blockchain transaction 606 may then be checked to see if the user's corresponding to the transaction and the accounts provided by HSBC and Revolut is correct and correspond to the users, i.e. Alice and Bob. This is step S412.

The payment processing resource 106 issues a notification to the event stream resource 110 confirming the blockchain transaction 606 (in a step S416) can be used as the basis for appending data to the event streams, i.e. the event streams in respect of Alice, Bob, Revolut and HSBC.

In this example, Alice, Bob, and HSBC each have their own event stream but, if they do not, an event stream may be initialised. That is to say, Alice has an event stream (E-Alice), Bob has an event stream (E-Bob) and HSBC have an event stream (E-HSBC), as do Revolut (E-Revolut).

The payment processing resource 106 uses the rendezvous transaction 606 to synchronise the payment with the event streams E-Alice, E-Bob, E-Revolut and E-HSBC by appending an entry to each of those event streams containing the hash of the payment instruction metadata contained in the data carrier in blockchain transaction 606. This is step S418. This is illustrated schematically in FIG. 4c. Event streams E-Alice, E-Bob, E-Revolut and E-HSBC may be of different lengths and the hash of the payment instruction data may be appended at different locations (otherwise known as indices) in respective event streams. This is because each event stream may contain a different number of events. A particularly active party like a bank, for instance, may have a substantially longer event stream than an individual and the payment instruction data may be added to the bank's event stream at a much higher index than it would be for an individual. It may also be that a bank may choose to initiate a new event stream after the number of entries appended to an event stream exceeds a pre-determined amount.

As with the other examples, each of the data carriers may hold a distinct dataDigest and/or a distinct streamDigest. The streamDigest may also be salted. Revolut and HSBC may opt to generate the salted streamDigest using a different hashing method to that which would be used by Alice and Bob.

The payment processing resource 106 then generates an identifier for the entry added to each of the event streams. This is step S420. The identifier may be alphanumeric or it may be a number which is generated based on the hash of the payment instruction metadata. For example, if the hash of the payment instruction metadata is generated by an SHA256 cipher, the identifier may be generated by applying a further SHA256 cipher to the hash of the payment instruction metadata. That is to say, the identifier may be a hash of the hash of the payment instruction metadata.

The payment processing resource 106 then stores the identifier alongside a copy of the payment instruction metadata in the payment data store 124. This enables verification of the payment between Alice and Bob on request.

We now describe a further example scenario where Alice again pays Bob a sum of 5 GBP but where Bob's account, whilst managed by HSBC, is a Euro account rather than a GBP account.

Figure 5A:
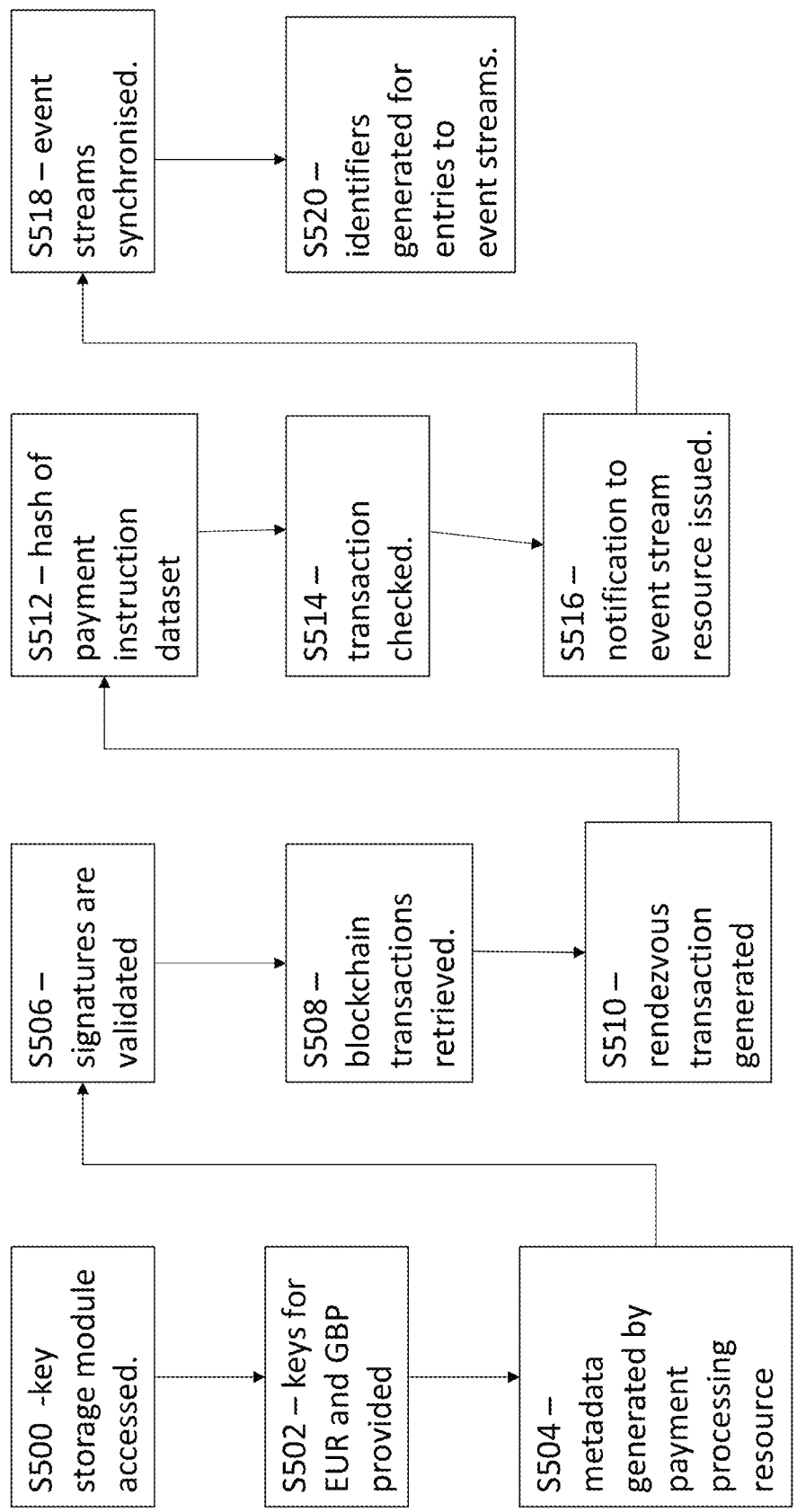
FIG. 5a illustrates a flow chart detailing a payment from a sender to a recipient in accordance with the embodiment.
Figure 5B:
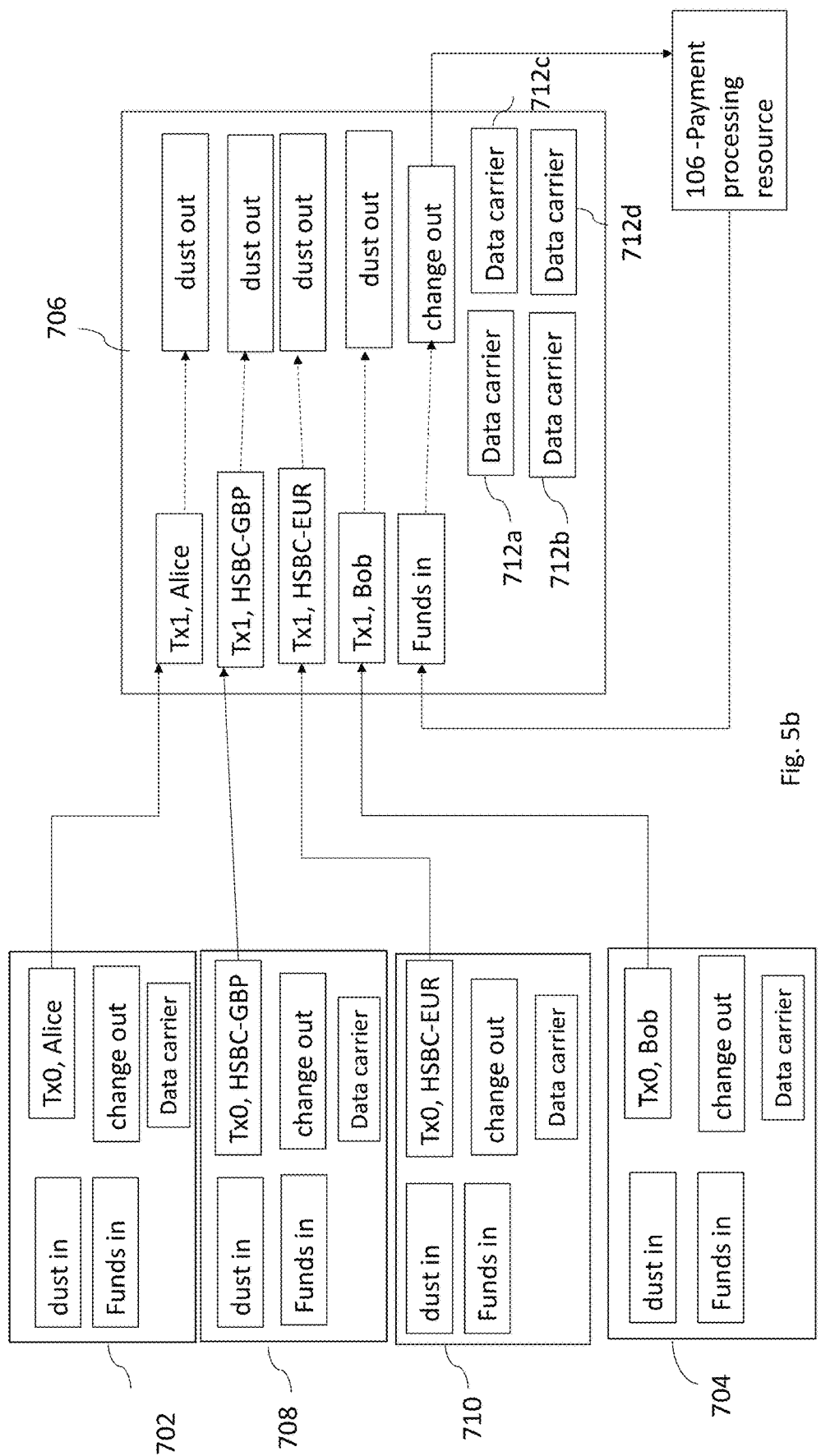
FIG. 5b illustrates a rendezvous transaction in accordance with the embodiment.

This is described with reference to FIG. 5a and FIG. 5b. This example is again identical to the example described with reference to FIGS. 3a to 3e up to step S326. Therefore, in the interests of brevity, we will begin our description at the stage described with reference to step S326.

That is to say, on checking by the payment protocol module 120 whether the data relating to the payment is consistent (in step S326) between the two parties to the transaction by checking the fields across the data corresponding to the parties. It is found that the currencies of the accounts for Alice and Bob are different. In other words, Alice has an account with HSBC in GBP and Bob has an account with HSBC in Euros, i.e. same bank but different currency, i.e. different asset identifier.

The payment protocol module 120 then halts the checking of the payment instruction dataset against the payment protocol criteria as the currencies are different. The payment processing resource 106 then generates further metadata to be added to the payment instruction dataset.

Generation of Further Metadata where Accounts are in Different Currencies

The payment processing resource 106 accesses the key storage module 122 with a request for cryptographic keys corresponding to the account HSBC owns in respect of GBP and the account HSBC owns in respect of EUR. This is step S500.

When the key storage module 122 is accessed, it receives input identifying the bank corresponding to the requested keys and the respective asset identifier, i.e. GBP and EUR. The key storage module 122 returns the keys corresponding to the banks GBP and EUR accounts. In this example, keys are returned corresponding to the GBP and EUR accounts managed by HSBC. This is step S502.

That is to say, in this instance, the assets do not have the same identification (as GBP and EUR are not the same currency) but Alice and Bob do have the same bank. This is what causes Step S326 to provide a negative outcome in this example. That is to say, the asset identification and the bank are not entirely consistent as the currencies are different.

In other words, there needs to be a balance in the currency for step S326 to provide a positive outcome as there needs to be a balance in the asset type.

The payment processing module 120 therefore needs to generate further metadata which resolves this inconsistency. The payment processing module 120, having obtained the keys corresponding to the GBP and EUR accounts managed by HSBC, can then generate this metadata.

In step S504, the payment processing module 120 generates metadata corresponding to two further payments. The first is from Alice's GBP HSBC account into the HSBC GBP account for 5 GBP (i.e. Alice pays 5 GBP back to HSBC) and then the second is a payment of 5.81 EUR from the HSBC EUR account to Bob's EUR HSBC account.

In step S506, the payment processing module 120 validates the cryptographic signatures of Alice and Bob (if it is required) by generating a hash of each signature and comparing the hash to one stored in the record generated in steps S200 to S214. This also confirms the identity of Alice and Bob. Alternatively or additionally, standard PKI techniques based on cryptographic private/public key pairs may also be used to validate each signature. These techniques can also be used to verify the identity of the client.

As the bank and the asset identification are now consistent, the requirements of Step S326 are satisfied and the payment protocol criteria can be satisfied. That is to say, metadata is created which causes the bank and the asset identification to balance.

Another way of illustrating this may utilise the template (XXX_BBBB:AAAA) to denote a bank and asset identification, where XXX is the operator of the account, BBBB is the bank identification and AAAA is the asset identification. That is to say, prior to the generation of the metadata in step S504, an attempt to transfer 5 GBP from Alice_HSBC:GBP to Bob_HSBC:EUR could not be completed. However, the creation of the metadata in step S504 means that 5 GBP is paid from Alice_HSBC:GBP to HSBC_HSBC:GBP and then 5.81 EUR (the equivalent of 5 GBP into EUR) is paid from HSBC_HSBC:EUR to Bob_HSBC:EUR means that the bank identification and the asset identification are balanced which means the transaction can be completed.

On completion of step S506, the payment processing resource 106 allows the payment from Alice to Bob of 5 GBP to be made in accordance with the payment instruction dataset. That is to say, the payment processing resource 106 resolves the lack of consistency in the payment instruction dataset by applying two further payments to resolve the lack of consistency and make the payment instruction dataset suitable for effecting the payment using the payment instruction dataset.

Rendezvous Transaction with Two Currencies

The payment processing resource 106 then retrieves a blockchain transaction from the blockchain 112 for each of Alice and Bob in a step S508. This is described with reference to the illustrative schematic in FIG. 5b.

The blockchain transaction 702 for Alice comprises a dust output (Tx0, Alice) and the blockchain transaction 704 for Bob comprises a dust output (Tx0, Bob). The dust outputs may be retrieved from a dust chain corresponding to event streams associated with Alice and Bob The payment processing resource 106 also retrieves a blockchain transaction for the currency accounts also involved in the payment. The retrieved blockchain transaction 708 for HSBC GBP (i.e. HSBC_HSBC:GBP) account comprises a dust output (Tx0, HSBC-GBP). The retrieved blockchain transaction 710 for HSBC EUR (i.e HSBC_HSBC:EUR) account comprises a dust output (Tx0, HSBC-EUR). As illustrated in FIG. 5b, each of blockchain transactions 702, 704, 708 and 710 also comprise a provably unspendable output which has a redeem script comprising an OP_RETURN command to ensure it cannot be spent but that the data carrier associated with the output remains on the blockchain. The dust outputs ((Tx0, HSBC-GBP) and (Tx0, HSBC-EUR) may be retrieved from a dust chain corresponding to event streams associated with HSBC's EUR and GBP accounts The payment processing resource 106 then (in a step S510) generates a new rendezvous blockchain transaction 706 comprising a dust input for each of Alice and Bob which spends the respective dust outputs from the blockchain transactions retrieved in step S508. This is also illustrated in FIG. 5b. The rendezvous blockchain transaction 706 further comprises dust inputs for HSBC-GBP and HSBC-EUR retrieved from blockchain transactions 708 and 710 respectively.

The relationship between chains of dust transactions and an event stream has already been elucidated with reference to FIG. 3d.

Rendezvous blockchain transaction 606 is a blockchain transaction for synchronising the plurality of event streams corresponding to each of Alice, Bob, Revolut and HSBC The dust input which spends the dust output for Alice is denoted as (Tx1, Alice) and the dust input which spends the dust output for Bob is denoted as (Tx1, Bob). The new rendezvous transaction also comprises dust inputs corresponding to HSBC's GBP and EUR accounts, denoted respectively as (Tx1, HSBC-GBP) and (Tx1,HSBC-EUR).

The funds into the rendezvous blockchain transaction 706 are added by the payment processing resource 106 and will be paid back to the payment processing resource 106. This may be minus any miner's fees following validation of the rendezvous blockchain transaction 706 if it is sent to the blockchain 112 for validation.

The rendezvous blockchain transaction 706 comprises further dust outputs which respectively spend Tx1, Alice and Tx1, Bob. The rendezvous blockchain transaction 706 also comprises dust outputs corresponding to the dust inputs retrieved from blockchains in respect of HSBC-GBP and HSBC-EUR The payment processing resource 106 also adds a provably unspendable output to the blockchain transaction 706 for each of Alice, Bob and the HSBC-GBP and HSBC-EUR accounts. These are used as data carriers 712a, 712b, 712c and 712d.

Like with the first example, the data payload held inside the data carrier (i.e. the hash of the payment instruction metadata) is held in an un-spendable OP_RETURN output of the transaction which means the data payload can then be stored in the blockchain as an unspendable output.

As with the first and second examples, the payment processing resource 106 may be configured to generate a new dust transaction using dust which does not form part of a pre-existing event stream and a HD key chain. A combination of dust inputs from pre-existing dust chains and new dust transactions may also be used to generate the blockchain transaction 706

The data inside the data carriers 712a, 712b, 712c and 712d comprises a hash of the payment instruction dataset generated by the payment processing resource 106. The data carriers may be identical as they are based on the same payment instruction dataset. Alternatively or additionally, The data inside the data carriers may be different as each relates to a different party.

That is to say, each respective data carrier may contain data which is relevant to each respective party in that each respective data carrier may be different dependent on the respective party. For example, the difference may be that data carriers in respect of Alice contain data which is only relevant to Alice, i.e. her name and her account number and data carriers in respect of Bob may contain data which is only relevant to Bob, i.e. his name and his account number.

The data carriers will therefore generate a different hash. This is generated in step S512. The provably unspendable output enables the rendezvous transaction 706 to carry the hash of the payment instruction dataset in the transaction and enables the hash to be stored on the blockchain. This means that the payment instruction dataset and, thus, a record of the payment is stored on the blockchain. This means that the record of the payment benefits from the immutability of the blockchain.

Like with the earlier examples, each of the data carriers may hold a distinct dataDigest and/or a distinct stream Digest.

The blockchain transaction 706 may then be checked to see if the user's corresponding to the transaction and the account provided by HSBC (in respect of both GBP and EUR) is correct and correspond to the users, i.e. Alice and Bob. This is step S514.

The payment processing resource 106 issues a notification to the event stream resource 110 confirming the blockchain transaction 606 (in a step S516) can be used as the basis for appending data to the event streams, i.e. the event streams in respect of Alice, Bob, Revolut and HSBC.

In this example, Alice, Bob, and HSBC (in respect of both GBP and EUR accounts) each have their own event stream but, if they do not, an event stream may be initialised. That is to say, Alice has an event stream (E-Alice), Bob has an event stream (E-Bob) and HSBC have an event stream for both currencies, i.e. (E-HSBC-GBP) and (E-HSBC-EUR).

The payment processing resource 106 uses the rendezvous transaction 706 to synchronise the payment with the event streams E-Alice, E-Bob, E-HSBC-GBP and E-HSBC-EUR by appending an entry to each of those event streams containing the hash of the payment instruction metadata contained in the data carrier in blockchain transaction 706. This is step S518. That is to say, if data output 712a corresponds to Alice then data output 712a will be hashed and added to Alice's event stream. This is illustrated schematically in FIG. 5c. Each entry will contain a hashed digest of the data contained on the stream up to that entry. Such a hashed digest of the stream will be stored with the entry on the stream.

The payment processing resource 106 then generates an identifier for the entry added to each of the event streams. This is step S520. As with the other examples, the identifier may be alphanumeric or it may be a number which is generated based on the hash of the payment instruction metadata. For example, if the hash of the payment instruction metadata is generated by an SHA256 cipher, the identifier may be generated by applying a further SHA256 cipher to the hash of the payment instruction metadata. That is to say, the identifier may be a hash of the hash of the payment instruction metadata.

The payment processing resource 106 then stores the identifier alongside a copy of the payment instruction metadata in the payment data store 124. This enables verification of the payment between Alice and Bob on request.

Figure 6A:
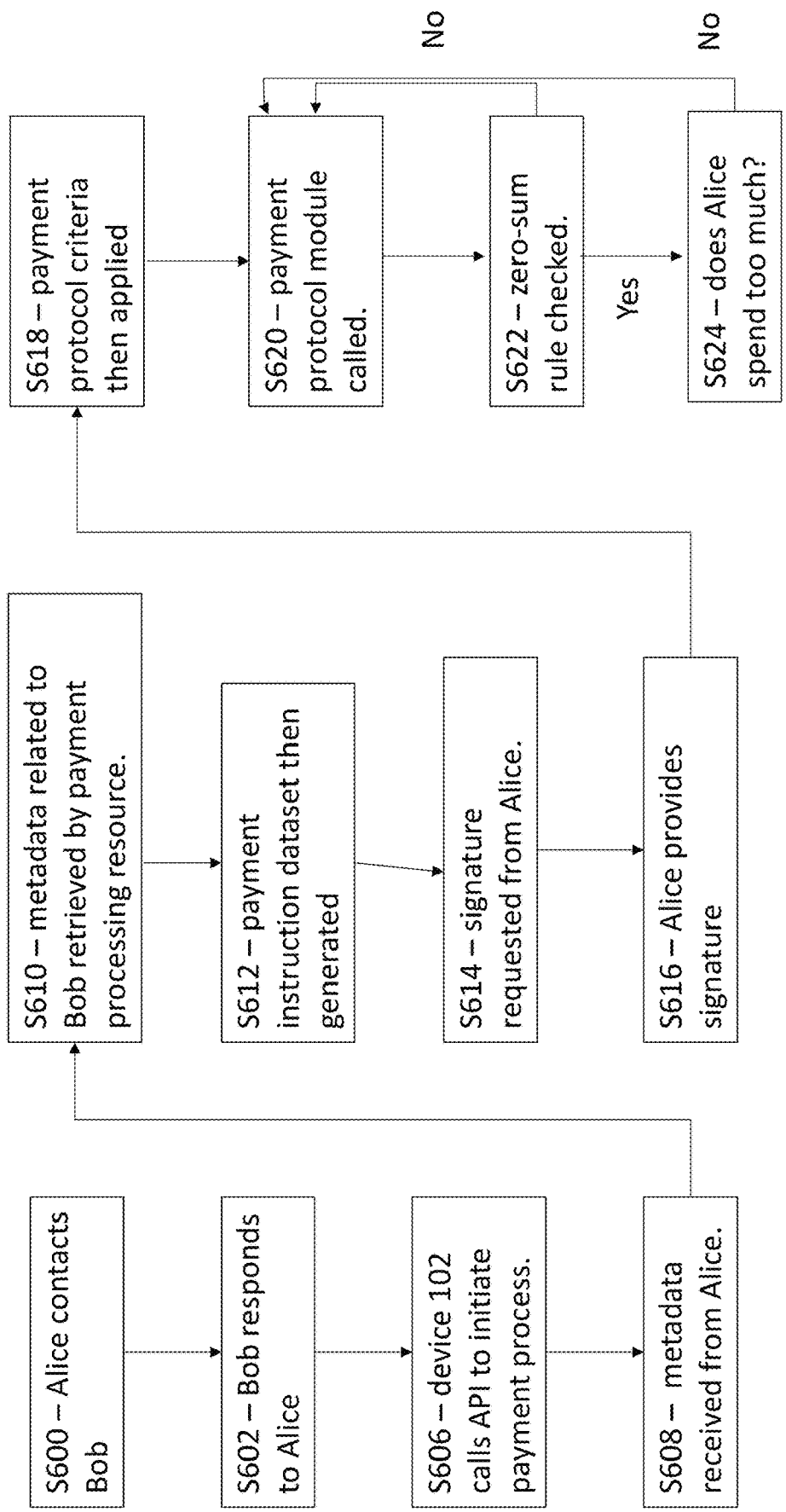
FIGS. 6a and 6b illustrates a flow chart detailing a payment from a sender to a recipient in accordance with the embodiment.
Figure 6B:
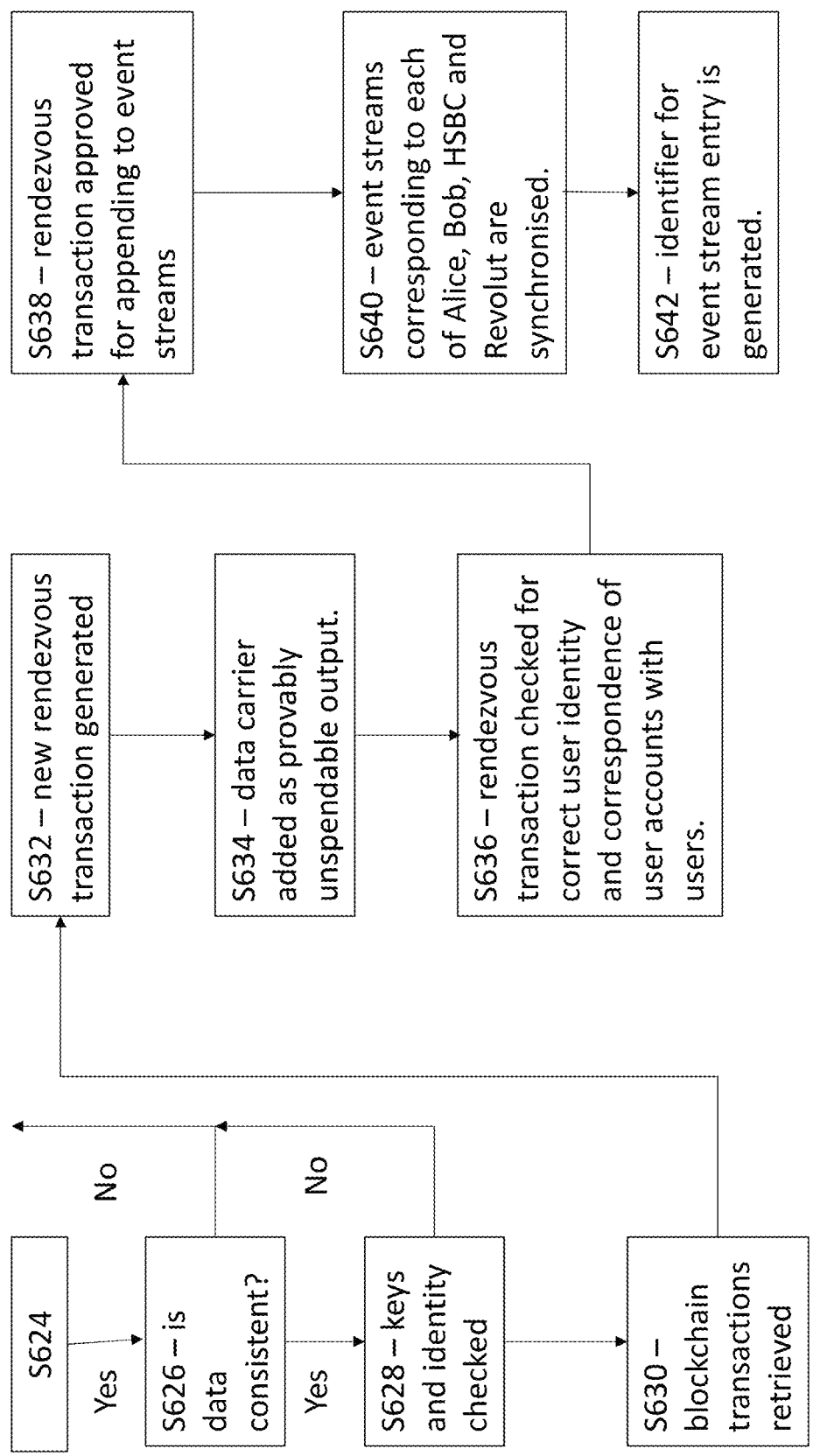

We now describe an example scenario where Alice sends a payment to Bob using the payment processing resource 106 with reference to FIG. 6a and FIG. 6b. The payment may be in respect of an amount of gold. An amount of gold is an example of an asset, the transfer of which and the payment for which is recorded by the method described below.

In a step S600, Alice contacts Bob to inform him of her wish to acquire 1 g of gold in exchange for 49.20 GBP. In step S602, Bob informs Alice of the price, i.e. 49.20 GBP. Both Alice and Bob have registered accounts with an issuer of gold such as, for example, The Royal Mint in the UK with their address at Ynysmaerdy, Pontyclun CF72 8YT (royal-mint.com). This, as will be described below, enables Alice and Bob to buy and sell gold in a legal and recordable manner.

Alice then uses first computing device 102 to indicate her agreement with Bob to pay 49.20 GBP for 1 g of gold to the payment processing resource 106. The first computing device 102 accesses API 108 to initiate the payment process using the account created by Alice in accordance with steps S200 to S214. Gold is identified by the first computing device 102 when the first computing device accesses API 108 to initiate the payment process. This enables the payment processing resource 106 to identify the transfer as being in respect of gold. Gold can be identified using an alphanumeric identifier or by a numerical code or by any other suitable identifier. This is step S606. The request from device 102 to API 108 indicates the amount that Alice wishes to pay to Bob. The request from device 102 also indicates the account from which Alice wishes to pay and the currency in which Alice wishes to pay and whom she wishes to pay, i.e. Bob. The amount Alice wishes to pay to Bob, the identification of Bob, the identification of the account from which Alice wishes to pay and the currency in which Alice wishes to pay form a set of payment metadata which is transmitted to the payment processing resource 106 in a step S608.

That is to say, the asset is identified as being GBP and the bank is also identified to the payment processing resource 106.

The payment processing resource 106, on receiving the payment metadata from Alice, then retrieves metadata from Bob's account based on the metadata Alice has provided in step S608. This is step S610. The payment processing resource 106 retrieves from Bob's account the currency which Bob's account relates to, i.e. pounds sterling (GBP) and the issuer of the gold account, i.e. the Royal Mint.

The payment processing resource 106, in step S612, then generates a payment instruction dataset using the payment metadata received from Alice and the information retrieved from Bob's account.

In this example, the provider of Bob's bank account is "HSBC" (i.e. the same as Alice) the currency is identified as GBP, the value of the payment (i.e. the amount being received by Bob) is 49.20 GBP, the identification of the account is given by <Bob: HSBC>; the user is identified as Bob by the "kyc" value and the actor is identified as the beneficiary of the payment, i.e. the individual receiving the payment. This forms a further part of the payment instruction dataset. The payment instruction dataset may optionally also include a version of the terms and conditions which have been signed by Bob using the signature <Bob_sig>

A further part of the payment instruction dataset is formed by the details of the gold transaction. The payment processing resource 106 requests access to Bob's gold account at the issuer of his gold account, i.e, the Royal Mint. The payment processing resource 106 is provided with a request for Bob's signature to enable the access to be granted. The payment processing resource 106 may then either retrieve Bob's cryptographic signature from a user profile corresponding to Bob or by separate request to Bob for the signature corresponding to his gold account. The signature may be the same or may be distinct from his signature for his "HSBC" account. Bob's signature may be required particularly for large amounts of gold or a commercial transaction related to the gold, where a set of terms and conditions may be involved and there may be a need for attestation by Alice or Bob to those terms and conditions.

Another part of the payment instruction dataset is formed by Alice's details. That is, the provider of Alice's account is "hsbc.com", the currency is identified as GBP, the value of the payment being transferred to Bob is 49.20 GBP (i.e. a debit of 49.20 GBP from Alice to be paid to Bob and so is expressed as −49.20 in the payment instruction dataset), the identification of the account is given by <Alice:HSBC>, the user is identified as Alice by the "kyc" value, the terms and conditions signed by Alice are identified by a signed document provided at URL provided by Alice and a hash of the said document. The actor is identified as the originator of the payment, i.e. the individual making the payment.

The payment processing resource 106 also requests access to Alice's gold account at the issuer, i.e. the Royal Mint. The payment processing resource 106 is provided with a request for Alice's signature to enable the access to be granted.

A message is then transmitted to first computing device 102 with a request for Alice's signature on the payment instruction dataset in a step S614. Alice then provides her cryptographic signature in a step S516 to approve the payment of 49.20 GBP to Bob. The signature is then applied by the payment processing resource 120 to the payment instruction dataset. The signature corresponding to Alice's gold account may be a different signature from the signature in respect of Alice's account at "hsbc.com". In the event it is different, Alice will provide both signatures in step S616. The payment processing resource 106 may, alternatively, already have access to the signature for Alice's gold account. That is to say, if the payment processing resource 106 is trusted by Alice then the retrieval of the signature from Alice is optional.

The payment processing resource 106 then generates further metadata corresponding to the transfer of gold from Bob's gold account to Alice's gold account. The metadata details the payment from Alice to Bob and the transfer from one gold account to the other.

The payment processing resource 106 then applies a payment protocol criteria to the payment instruction dataset in a step S618. The payment processing resource 106 accesses a payment protocol module 120 in a step S620.

The payment protocol module 120 first checks that the payment instruction dataset obeys a zero-sum rule in that the amounts are consistent, i.e. the amount being taken from Alice's account equals the amount being paid to Bob's account. This is step S522. The zero-sum rule is obeyed because 49.20 GBP is being taken from Alice's account and 49.20 GBP is being paid to Bob's account. The inconsistency between the amounts could be due to differing currencies, for example. The inconsistency between the amounts could be due to differing currencies, for example. That is to say, the payment protocol module 120 determines that the asset identification and the bank identification is consistent (and it is because, in accordance with the template above, Alice_HSBC:GBP balances with Bob_HSBC:GBP and Alice_MINT:GOLD balances with Bob_MINT:GOLD)

Alternatively or additionally, the inconsistency could be present if Bob only has a GBP account with HSBC and Alice only has an EUR account with Revolut, i.e. distinct asset identification and distinct asset registry, i.e. (a payment to Bob_HSBC:GBP cannot be made from Alice_REVOLUT:EUR). The payment protocol module 120 would then generate further metadata corresponding to a brokerage part of the transaction. This metadata would correspond to the role a financial broker (enumerated here as a first broker) would play in the transaction to resolve the inconsistency in the currency and the bank, similar to what is described above in examples where the currency and the bank are distinct which causes an imbalance in the asset identification and the bank. In this example, the broker has a GBP account with HSBC and a EUR account with Revolut. The payment protocol module 120 would access the cryptographic signatures corresponding to those two accounts. The metadata would detail a transfer of the agreed quantity of gold from Bob's gold account to Alice's gold account; a payment of EUR from Alice's EUR revolut account (i.e. Alice_REVOLUT:EUR) to the broker's EUR account (i.e. Broker_Revolut:EUR) with Revolut; and a payment of a corresponding amount of GBP from the broker's GBP (i.e. Broker_Revolut:GBP) account to Bob (Bob_HSBC:GBP) to balance the bank identification and the asset type. This further metadata would also be signed with the cryptographic signatures corresponding to those accounts.

Optionally or additionally, If the first broker only offered EUR to GBP exchange only within Revolut accounts, i.e. not between different banks, the payment protocol module 120 would then need to generate further metadata corresponding to the part played by a second broker in addition to the first broker. This metadata would detail a transfer of the agreed quantity of gold from Bob's gold account (Bob_MINT:GOLD) to Alice's gold account (Alice_MINT:GOLD); a payment from Alice's EUR account (Alice_REVOLUT:GOLD) to the EUR account held by the first broker (i.e. the EUR account with Revolut); a payment from the first broker's GBP account (i.e. the GBP account with Revolut which would be identified as Broker1_REVOLUT:GBP) to the second broker's GBP account with HSBC; and a payment from the second broker's GBP account to Bob's GBP account with HSBC. That is to say, the payment protocol module 120 can be used to build the set of metadata to address inconsistency (or lack of correspondence) between aspects of the payment instruction metadata checked in step S522.

The payment protocol module 120 then checks that the amount being transferred from Alice to Bob does not make Alice's balance fall below some minimum value. This is step S624. That is to say, does Alice spend too much on the gold she is acquiring from Bob? If Alice is spending too much, i.e. if her balance does fall below a minimum value, then the payment protocol module 120 will issue an error message to Alice to let her know she cannot spend the money she wishes to spend. Indeed, it is possible for the minimum value to be negative if a credit facility is being used. The payment protocol module 120 will return to step S520 until it is given the instruction to begin again, i.e. when Alice has deposited more funds into her account or her minimum balance has been altered.

The payment protocol module 120 then checks whether the data relating to the payment is consistent between the two parties to the transaction by checking the fields across the data corresponding to the issuing parties. This is step S526. The data is consistent between the two parties as the parties providing the accounts are identical and the asset identification is identical or the lack of consistency has been resolved by the payment protocol module 120 introducing further metadata corresponding to the role brokers can play in resolving inconsistencies in an asset transfer where an asset identifier or an asset registry are not consistency. As the transfer relates to gold, the amount of gold being transferred from Bob to Alice must complement the amount of gold being added to Alice's account.

That is to say, there is a requirement that, for a transfer to be enabled there must be consistency between the bank and the asset identifier identified on both sides of the transfer. There is also a requirement for the zero-sum rule to be satisfied in respect of both the GBP and the gold.

The payment processing module 120 validates the cryptographic signatures of Alice and Bob by generating a hash of each signature and comparing the hash to one stored in the record generated in steps S200 to S214. This is step S628. This also confirms the identity of Alice and Bob. Alternatively or additionally, standard PKI techniques based on cryptographic private/public key pairs may also be used to validate each signature. These techniques can also be used to verify the identity of the client. The payment processing module 120 also validates the signatures of Alice and Bob's gold accounts using similar techniques. The payment processing module 120 also performs a check on Bob's account to determine that the requisite amount of gold is recorded in Bob's name so that it can be transferred from Bob to Alice. If brokers have also been used, the cryptographic signatures corresponding to the brokerage accounts are also validated.

The satisfaction of steps S522, S524, S526 and S528 mean the criteria stipulated by the payment protocol have been satisfied and so the payment processing resource 106 allows the payment from Alice to Bob of 49.20 GBP to be made in accordance with the payment instruction dataset. The transfer of gold can also then be recorded by the issuer of the gold accounts.

Figure 7:
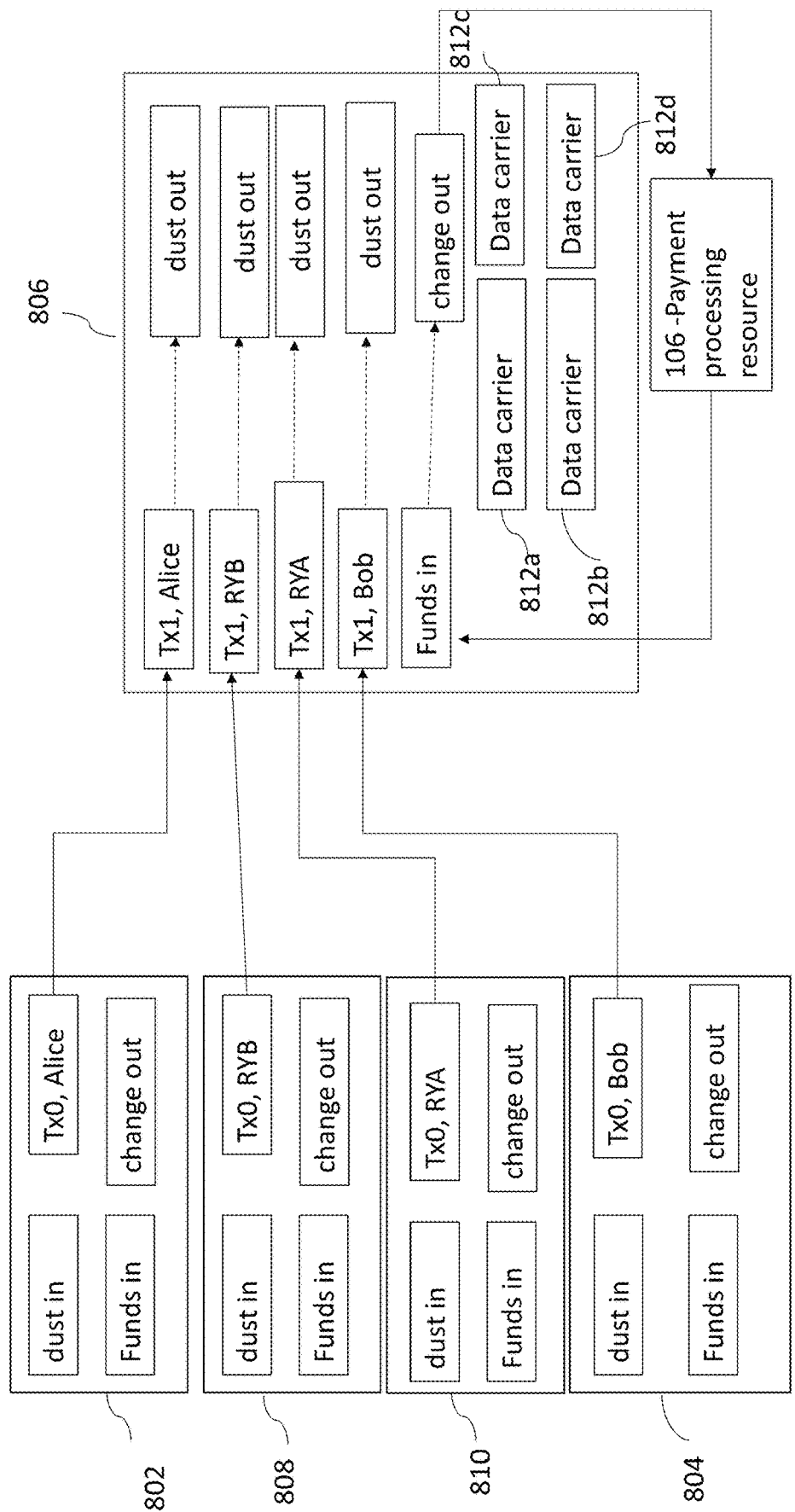
FIG. 7 illustrates a rendezvous blockchain transaction generated in accordance with the embodiment.

The payment processing resource 106 then retrieves a blockchain transaction from the blockchain 112 for each of Alice and Bob in a step S630. The blockchain transaction 802 for Alice comprises a dust output (Tx0, Alice) and the blockchain transaction 804 for Bob comprises a dust output (Tx0, Bob). The dust outputs may be retrieved from a dust chain corresponding to event streams associated with Alice and Bob The payment processing resource 106 also retrieves a blockchain transaction for both of the gold accounts involved in the payment, i.e. Royal Mint—Alice and Royal Mint—Bob. The retrieved blockchain transaction 808 for Royal Mint—Bob comprises a dust output (Tx0, RYB) and the retrieved blockchain transaction 810 for Royal Mint-Alice comprises a dust output (Tx0, RYA). If brokers are also involved then blockchain transactions may be also retrieved from the blockchain 112 for each of the brokers. The dust outputs ((Tx0, RYB) and (Tx0, RYA) may be retrieved from a dust chain corresponding to event streams associated with Alice and Bob's gold accounts Generation of a Rendezvous Transaction with Additional Issuer The payment processing resource 106 then generates a new rendezvous blockchain transaction 806 comprising a dust input for each of Alice and Bob which spends the respective dust outputs from the blockchain transactions retrieved in step S530.This is illustrated in FIG. 7. The rendezvous blockchain transaction 806 further comprises dust inputs spending corresponding outputs retrieved from blockchain transactions 808 and 810, i.e. for the gold accounts for Alice and Bob.

Each of the retrieved blockchain transactions may also contain a data carrier associated with an OP_RETURN script, i.e. a provably unspendable output.

The dust input which spends the dust output for Alice is denoted as Tx1, Alice and the dust input which spends the dust output for Bob is denoted as Tx1, Bob. The new rendezvous transaction also comprises dust inputs corresponding to the gold accounts Alice and Bob hold, denoted respectively as (Tx1, RYA) and (Tx1, RYB) The rendezvous blockchain transaction 806 is generated in step S632.

The funds into the rendezvous blockchain transaction 806 are added by the payment processing resource 106 and will be paid back to the payment processing resource 106. This may be minus any miners fees following validation of the rendezvous transaction 806 if it is sent to the blockchain 112 for validation.

The rendezvous blockchain transaction 806 comprises further dust outputs which respectively spend Tx1, Alice and Tx1, Bob. The rendezvous blockchain transaction 806 also comprises dust outputs corresponding to the dust inputs retrieved from blockchains in respect of the two gold accounts. As it is a rendezvous transaction, the indexes of the input/output pairs corresponding respectively to Alice, Bob and the two gold accounts are identical in that, for example, the input index of Tx1, Alice may be assigned as number 1 and the output index of the corresponding dust output is assigned as output index number 1.

The payment processing resource 106 also adds a provably unspendable output to the blockchain transaction 806 in respect of Alice, Bob and the two gold accounts. These are denoted respectively as data carriers 812*a*, 812*b*, 812*c* and 812*d*

Provably unspendable outputs may also be added which correspond to the brokers involved in the transaction. They correspond to data carriers for the brokers.

As with the other examples, each of the data carriers may hold a distinct dataDigest and/or streamDigest. The streamDigest may, like with the other examples, be salted.

The blockchain transaction 806 may also be generated using dust which has not previously been used as the basis for an event stream. This "new dust" will be used in combination with HD key chain as is described in UK patent application no. 2102217.3 to generate the blockchain transaction 806 as with the other examples.

As with the other examples, the data payload held inside the respective data carriers (i.e. the hash of the payment instruction metadata) is held in an un-spendable OP_RETURN output of the transaction which means the data payload can then be stored in the blockchain as an unspendable output. Like with the first example, holding the data payload held inside the data carrier (i.e. the hash of the payment instruction metadata) which is held in an un-spendable OP_RETURN output of the transaction means the data payload can then be stored in the blockchain as an unspendable output.

The data inside the data carriers comprises a hash of the payment instruction dataset generated by the payment processing resource in steps S600 to S628. The data inside the data carriers may be identical in that it is based on an identical payment instruction dataset. Alternatively or additionally, the respective hash for each data carrier may be different as the data is different. For example, Alice's data is different from Bobs as it relates to her account activity and not Bob's. This is step S634. The provably unspendable output enables the rendezvous transaction 806 to carry the hash of the payment instruction dataset in the transaction and enables the hash to be stored on the blockchain. This means that the payment instruction dataset and, thus, a record of the payment is stored on the blockchain. This means that the record of the payment benefits from the immutability of the blockchain. In the case of a transfer of gold, this means that the blockchain can be used to support a record of a transaction from one gold account to the other. The anonymity provided by the blockchain and by the system described herein also means that confidentiality of the gold transfer can be maintained.

The blockchain transaction 806 may then be checked to see if the user's corresponding to the transaction and the gold accounts corresponding to those owned by Alice and Bob are correct. This is step S636.

The payment processing resource 106 issues a notification to the event stream resource 110 confirming the blockchain transaction 806 in a step S638 can be used as the basis for appending data to the event streams, i.e. the event streams in respect of Alice, Bob and the two gold accounts.

Figure 8:
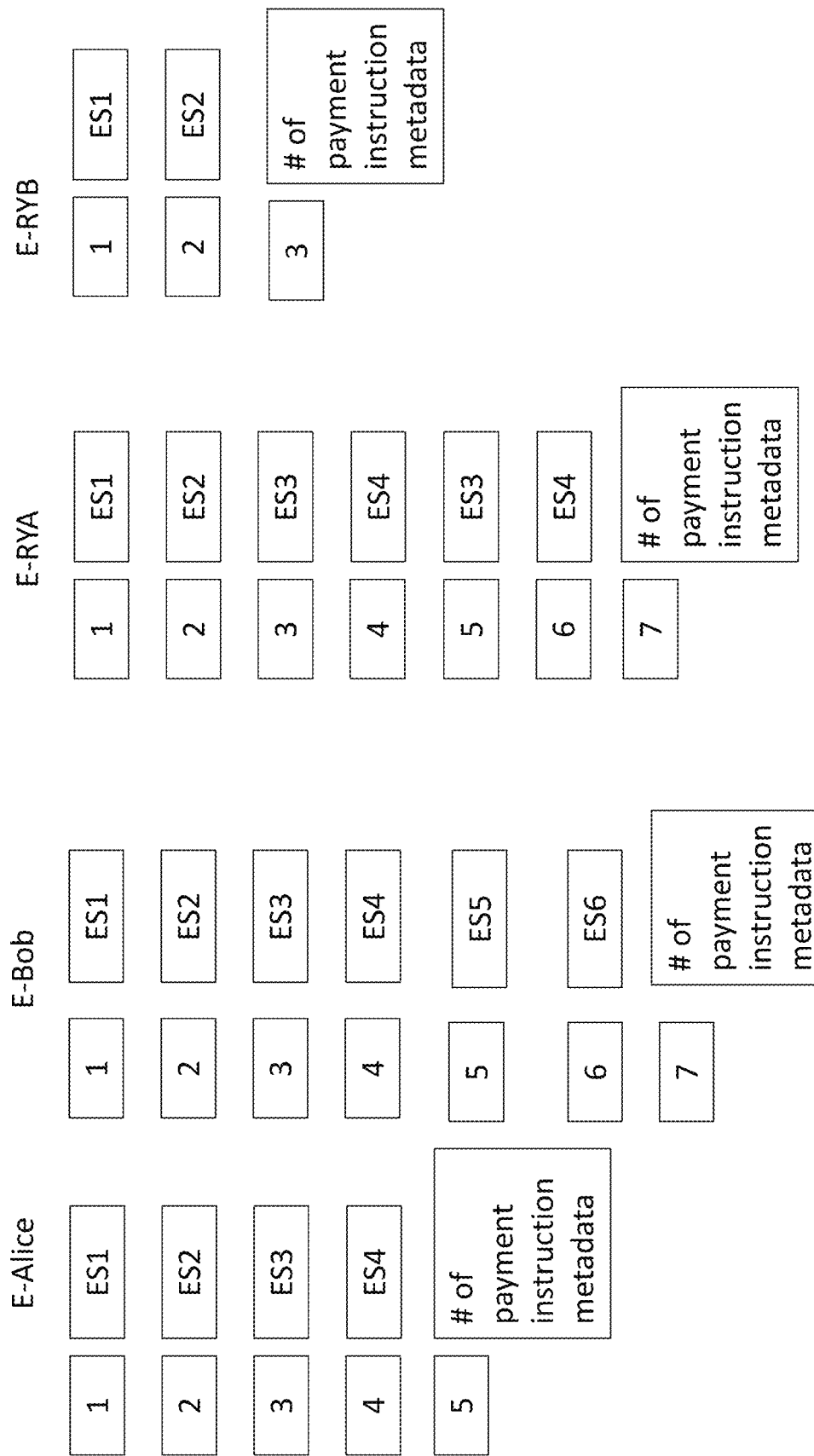
FIG. 8 illustrates event streams for parties to a transaction in accordance with the embodiment.

The payment processing resource 106 uses the rendezvous transaction 806 to synchronise the payment with the event streams E-Alice, E-Bob, E-RYA (i.e. Alice's gold account) and E-RYB (i.e. Bob's gold account) by appending an entry to each of those event streams containing the hash of the payment instruction metadata contained in the respective data carrier in blockchain transaction 806. That is to say, the hash corresponding to data output 812*a* may be added to E-Alice and the hash corresponding to data output 812*b* may be added to E-Bob. This is step S640. This is illustrated schematically in FIG. 8. Entries can also be appended to event streams corresponding to the brokers involved in the transfer of the gold.

The payment processing resource 106 then generates an identifier for the entry added to each of the event streams. This is step S642. The identifier may be alphanumeric or it may be a number which is generated based on the hash of the payment instruction metadata. For example, if the hash of the payment instruction metadata is generated by an SHA256 cipher, the identifier may be generated by applying a further SHA256 cipher to the hash of the payment instruction metadata. That is to say, the identifier may be a hash of the hash of the payment instruction metadata.

The payment processing resource 106 then stores the identifier alongside a copy of the payment instruction metadata in the payment data store 124.

It should be noted that the above-mentioned aspects and embodiments illustrate rather than limit the disclosure, and that those skilled in the art will be capable of designing many alternative embodiments without departing from the scope of the disclosure as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The disclosure may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of recording an asset transfer event involving at least a first user and a second user, the method implemented by a computing resource, the method comprising:
receiving instruction data, the instruction data related to a requested asset transfer event, the instruction data comprising a first set of metadata related to a sender of the asset and a second set of metadata related to at least one recipient of the asset, wherein each of the sender and the recipient are each associated with an account associated with an asset registry;
associating the sender of the asset with a first event stream and associating the recipient of the asset with a second event stream;
comparing the first set of metadata and the second set of metadata to determine, in accordance with a transfer protocol, whether a transfer of the asset from the sender to the at least one recipient can be made, wherein the transfer protocol defines at least one criterion for enabling an asset transfer event to take place;
based on the comparison between the respective sets of metadata in accordance with the transfer protocol, determining one or more items of correspondence between the respective sets of metadata;
based on the determined correspondence, for the sender and the at least one recipient, identifying a previous blockchain transaction associated with each respective first and second event stream; and
generating a further blockchain transaction for synchronising a respective first and second event streams with the asset transfer event, the further blockchain transaction comprising,
for each of the sender and the at least one recipient:
a dust input spending a dust output associated with the previous transaction and a respective unspent transaction output (UTXO), and an unspent transaction output associated with the asset transfer event.

2. The method of claim 1, wherein determining one or more items of correspondence between the respective sets of metadata comprises determining correspondence between at least one of:
i) a currency of payment identified in the respective sets of metadata;
ii) an amount of the currency being paid from an account corresponding to the sender and the amount of the currency requested from an account corresponding to the recipient; and
iii) identifiers of the asset registry associated with the sender and recipient accounts.

3. The method of claim 1, wherein the computing resource determines, in accordance with the transfer protocol, that the transfer cannot be made; and generates a further set of metadata to resolve a lack of concordance with the transfer protocol.

4. The method of claim 3, wherein the generation of the further set of metadata comprises generating a metadata enabling conversion between a first currency and a second currency.

5. The method of claim 3, wherein the generation of the further set of metadata comprises generating metadata for one asset registry to record a transfer of a given asset to another asset registry.

6. The method of claim 3, wherein the method further comprises identifying a previous blockchain transaction for an asset registry associated with at least one of the accounts; and the further blockchain transaction comprises a dust input spending a dust output associated with the previous transaction identified for the registry and the further blockchain transaction further comprises a respective unspent transaction output (UTXO) corresponding to the dust input.

7. The method of claim 6, wherein the method further comprises:
   initialising an event stream in association with the registry associated with the at least one account; and
   synchronising the event stream associated with the computing resource with the first and second event streams based on the asset transfer event.

8. The method of claim 7, wherein the synchronisation comprises appending metadata corresponding to the asset transfer event to the event stream associated with the asset registry.

9. The method of claim 3, wherein the computing resource applies a cryptographic signature to the further set of metadata.

10. The method of claim 1, wherein the computing resource retrieves cryptographic signatures corresponding to the sender and the recipient and applies the respective cryptographic signatures to the metadata.

11. The method of claim 10, wherein the respective cryptographic signatures are retrieved from computing devices associated with the sender and the recipient.

12. A computer-implemented method of transferring an asset from a first user to a second user, the method implemented by a first computing resource associated with a sender of the asset, the method comprising:
   receiving a request for transfer of an asset from a second computing resource configured to perform a computer-implemented method of recording an asset transfer event involving at least the first user and the second user, the method implemented by the second computing resource, the method comprising:
      receiving instruction data, the instruction data related to a requested asset transfer event,
         the instruction data comprising a first set of metadata related to the sender of the asset and a second set of metadata related to at least one recipient of the asset,
         wherein each of the sender and the recipient are each associated with an account associated with an asset registry;
      associating the sender of the asset with a first event stream and associating the recipient of the asset with a second event stream;
      comparing the first set of metadata and the second set of metadata to determine, in accordance with a transfer protocol, whether a transfer of the asset from the sender to the at least one recipient can be made, wherein the transfer protocol defines at least one criterion for enabling an asset transfer event to take place;
      based on the comparison between the respective sets of metadata in accordance with the transfer protocol, determining one or more items of correspondence between the respective sets of metadata;
      based on the determined correspondence, for the sender and the at least one recipient,
         identifying a previous blockchain transaction associated with each respective first and second event stream; and
      generating a further blockchain transaction for synchronising a respective first and second event streams with the asset transfer event, the further blockchain transaction comprising, for each of the sender and the at least one recipient:
         a dust input spending a dust output associated with the previous transaction and a respective unspent transaction output (UTXO), and an unspent transaction output associated with the asset transfer event;
   generating a first set of metadata indicating:
      (i) an account to be used for the transfer;
      (ii) an amount of the asset to be taken from the account; and
      (iii) an indicator of a currency to be used for the transfer;
   transmitting the first set of metadata to the second computing resource to initiate the transfer;
   receiving instruction data related to the requested transfer from the second computing resource;
   signing the instruction data using a cryptographic signature to generate signed instruction data;
   transmitting the signed instruction data to the second computing resource.

13. A method of recording an asset transfer event involving at least a first user and a second user, the method implemented by a computing resource and comprising:
   receiving instruction data, the instruction data related to a requested asset transfer event, the instruction data comprising a first set of metadata related to a sender of the asset and a second set of metadata related to at least one recipient of the asset, wherein each of the sender and the recipient are each associated with an account associated with an asset registry;
   associating the sender of the asset with a first event stream and associating the recipient of the asset with a second event stream;
   comparing the first set of metadata and the second set of metadata to determine, in accordance with a transfer protocol, whether a transfer of the asset from the sender to the at least one recipient can be made, wherein the transfer protocol defines at least one criterion for enabling an asset transfer event to take place;
   based on the comparison between the respective sets of metadata in accordance with the transfer protocol, determining one or more items of correspondence between the respective sets of metadata;
   based on the determined correspondence, for the sender and the at least one recipient, identifying a previous blockchain transaction associated with each respective first and second event stream;
   generating a further blockchain transaction for synchronising a respective first and second event streams with the asset transfer event, the further blockchain transaction comprising,
      for each of the sender and the at least one recipient:
         a dust input spending a dust output associated with the previous transaction and a respective unspent transaction output (UTXO), and an unspent transaction output associated with the asset transfer event;
   receiving a request to verify an asset transfer event comprising an identifier associated with the asset transfer event from a computing resource;
   searching for an event stream entry associated with the identifier to extract metadata associated with the asset transfer event; and
   transmitting a confirmation of asset transfer event to a computing resource.

14. A system, comprising:
a computing resource including a processor; and
a memory storing instructions, that, when executed by the processor, causing the computing resource to perform method of recording an asset transfer event involving at least a first user and a second user, the method comprising:
receiving instruction data, the instruction data related to a requested asset transfer event, the instruction data comprising a first set of metadata related to a sender of the asset and a second set of metadata related to at least one recipient of the asset, wherein each of the sender and the recipient are each associated with an account associated with an asset registry;
associating the sender of the asset with a first event stream and associating the recipient of the asset with a second event stream;
comparing the first set of metadata and the second set of metadata to determine, in accordance with a transfer protocol, whether a transfer of the asset from the sender to the at least one recipient can be made, wherein the transfer protocol defines at least one criterion for enabling an asset transfer event to take place;
based on the comparison between the respective sets of metadata in accordance with the transfer protocol, determining one or more items of correspondence between the respective sets of metadata;
based on the determined correspondence, for the sender and the at least one recipient, identifying a previous blockchain transaction associated with each respective first and second event stream; and
generating a further blockchain transaction for synchronising a respective first and second event streams with the asset transfer event, the further blockchain transaction comprising, for each of the sender and the at least one recipient:
a dust input spending a dust output associated with the previous transaction and a respective unspent transaction output (UTXO), and an unspent transaction output associated with the asset transfer event.

* * * * *